(12) United States Patent
Wu

(10) Patent No.: US 11,703,652 B2
(45) Date of Patent: Jul. 18, 2023

(54) FIBER OPTIC CABLE ASSEMBLY WITH INTEGRATED SHUFFLE AND FABRICATION METHOD

(71) Applicant: CORNING RESEARCH & DEVELOPMENT CORPORATION, Corning, NY (US)

(72) Inventor: Qi Wu, Painted Post, NY (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 17/521,002

(22) Filed: Nov. 8, 2021

(65) Prior Publication Data

US 2022/0057592 A1 Feb. 24, 2022

Related U.S. Application Data

(63) Continuation of application No. PCT/US2020/030237, filed on Apr. 28, 2020, which is a continuation of application No. 16/419,571, filed on May 22, 2019, now Pat. No. 10,678,012.

(51) Int. Cl.
*G02B 6/44* (2006.01)

(52) U.S. Cl.
CPC .......... *G02B 6/4472* (2013.01); *G02B 6/447* (2013.01); *G02B 6/4471* (2013.01)

(58) Field of Classification Search
CPC .................................................. G02B 6/4472
See application file for complete search history.

(56) References Cited

U.S. PATENT DOCUMENTS

| 4,900,126 A | 2/1990 | Jackson et al. |
| 5,457,762 A | 10/1995 | Lochkovic et al. |
| 5,832,162 A | 11/1998 | Sarbell |
| 6,464,404 B1 | 10/2002 | Robinson et al. |
| 6,549,710 B2 | 4/2003 | Simmons et al. |
| 6,655,848 B2 | 12/2003 | Simmons et al. |
| 7,082,250 B2 | 7/2006 | Jones et al. |
| 8,548,294 B2 | 10/2013 | Toge et al. |
| 9,154,860 B2 | 10/2015 | Hessong et al. |
| 9,360,624 B2 | 6/2016 | Faulkner et al. |
| 9,690,048 B2 | 6/2017 | Hagen et al. |
| 9,810,847 B1 | 11/2017 | Carberry et al. |
| 10,025,057 B2 | 7/2018 | Sano et al. |
| 10,678,012 B1 * | 6/2020 | Wu .................... G02B 6/447 |
| 2003/0016934 A1 | 1/2003 | Sun et al. |
| 2003/0048995 A1 | 3/2003 | Robinson et al. |

(Continued)

OTHER PUBLICATIONS

International Search Report and Written Opinion of the International Searching Authority; PCT/US2020/030237; dated Jul. 9, 2020; 10 pages; European Patent Office.

*Primary Examiner* — Michael Stahl

(57) ABSTRACT

A fiber optic cable assembly suitable for providing mesh connectivity includes a fiber shuffle region arranged between first and second cable assembly sections that each include multiple tubes each containing a group of optical fibers, with a jacket provided over one or both cable assembly sections. The fiber shuffle region may be compact in width and length, and integrated into a trunk cable. Optical fibers remain in sequential order in groups at ends of the cable assembly sections, where the fibers may be ribbonized and/or connectorized. A fabrication method for such a fiber optic cable assembly is also disclosed.

13 Claims, 16 Drawing Sheets

(56) References Cited

U.S. PATENT DOCUMENTS

| | | |
|---|---|---|
| 2004/0037523 A1 | 2/2004 | Yow et al. |
| 2004/0114901 A1 | 6/2004 | Baechtle |
| 2004/0126069 A1 | 7/2004 | Jong et al. |
| 2015/0218038 A1 | 8/2015 | Carberry et al. |
| 2017/0045700 A1 | 2/2017 | Conrad et al. |
| 2018/0031792 A1 | 2/2018 | Risch et al. |
| 2018/0196211 A1* | 7/2018 | Agata .................... G02B 6/443 |
| 2018/0275356 A1 | 9/2018 | Li et al. |
| 2018/0341080 A1 | 11/2018 | Conrad et al. |
| 2019/0219788 A1 | 7/2019 | Childers et al. |

\* cited by examiner

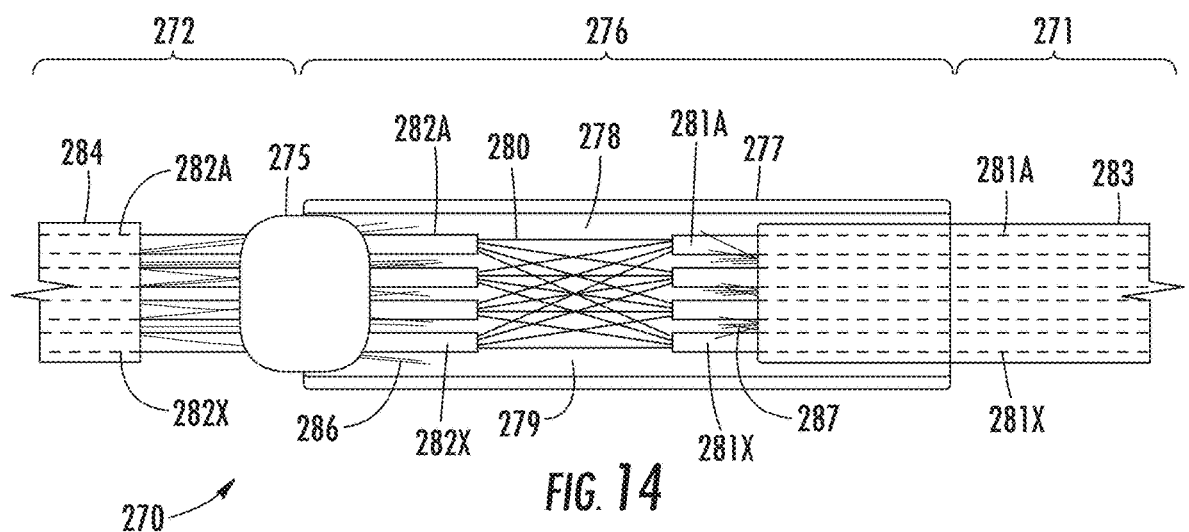

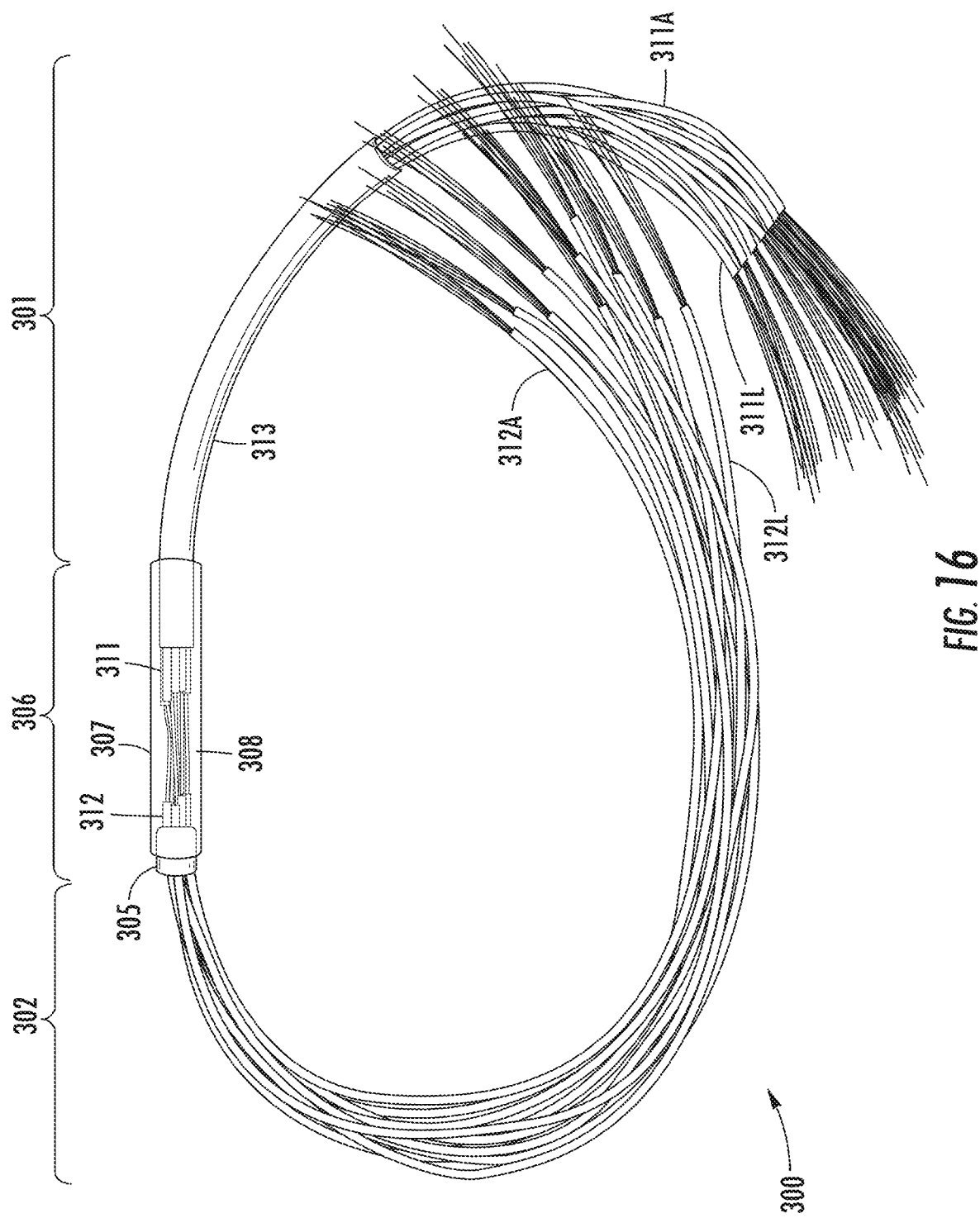

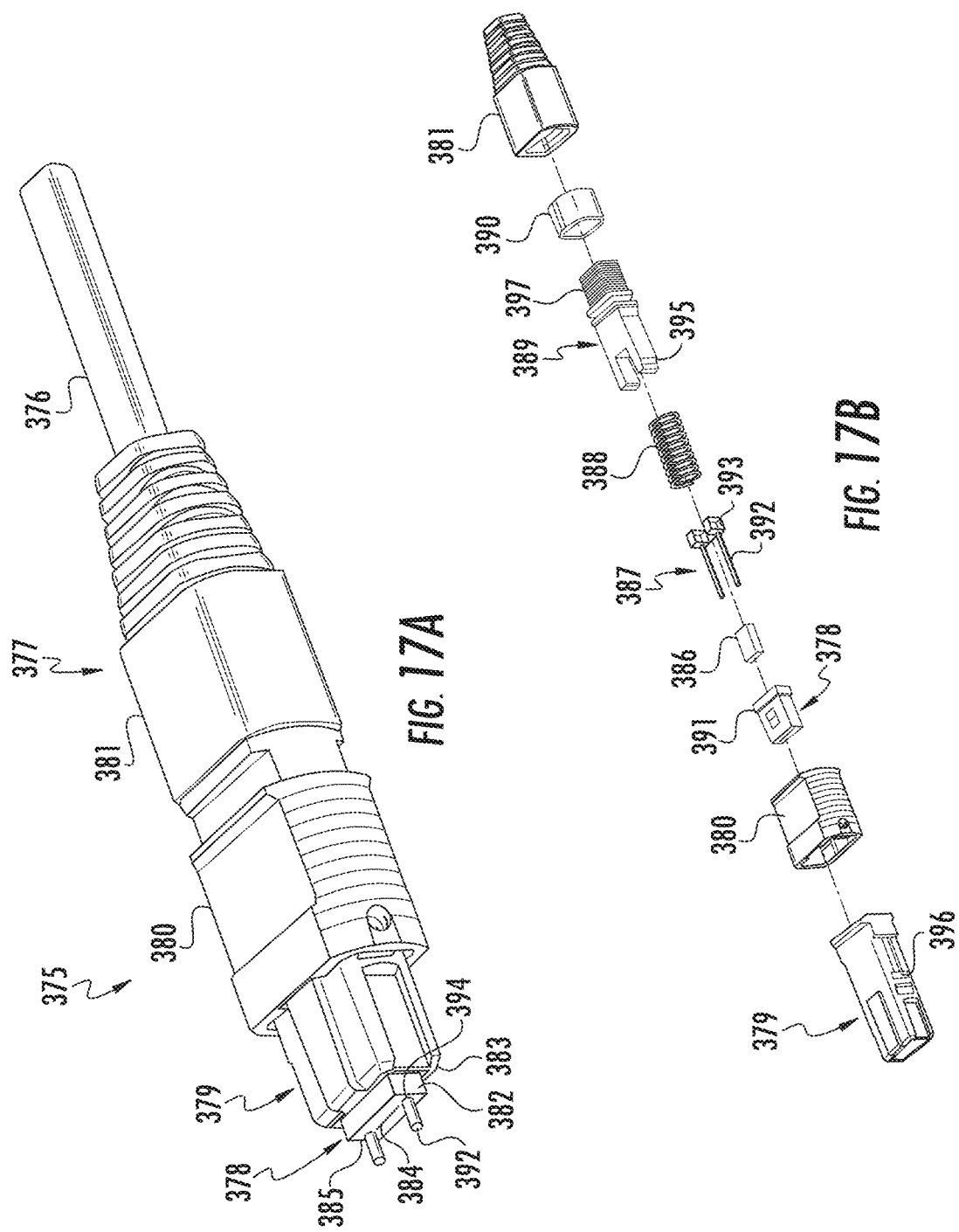

FIBER OPTIC CABLE ASSEMBLY WITH INTEGRATED SHUFFLE AND FABRICATION METHOD

PRIORITY APPLICATION

This application is a continuation of International Application No. PCT/US20/30237, filed on Apr. 28, 2020, which claims the benefit of priority to U.S. application Ser. No. 16/419,571, filed on May 22, 2019, now U.S. Pat. No. 10,678,012, both applications being incorporated herein by reference.

BACKGROUND

The disclosure relates generally to fiber optic cable assemblies suitable for making optical cross connections, in addition to methods for fabricating such assemblies.

Optical fibers are useful in a wide variety of applications, including the telecommunications industry for voice, video, and data transmission. In a telecommunications system that uses optical fibers, there are typically many locations where fiber optic cables (which carry the optical fibers) connect to equipment or other fiber optic cables.

FIG. 1 is a cross-sectional view of an exemplary coated optical fiber 100 that includes a glass core 102, glass cladding 104 surrounding the glass core 102, and a multi-layer polymer coating 110 (including an inner primary coating layer 106 and an outer secondary coating layer 108) surrounding the glass cladding 104. The inner primary coating layer 106 may be configured to act as a shock absorber to minimize attenuation caused by any micro-bending of the coated optical fiber 100. The outer secondary coating layer 108 may be configured to protect the inner primary coating layer 106 against mechanical damage, and to act as a barrier to lateral forces. The outer diameter of the coated optical fiber 100 may be about 200 μm, about 250 μm, or any other suitable value. Optionally, an ink layer (e.g., having a thickness of about 5 μm) may be arranged over the outer secondary coating layer 108 of the coated optical fiber 100 to color the fiber (e.g., as is commonly used in ribbonized fibers), or a coloring agent may be mixed with the coating material that forms the outer secondary coating layer 108. An additional covering (not shown), which may be embodied in a tight buffer layer or a loose tube (also known as a furcation tube or fanout tube), may be applied to the coated optical fiber 100 to provide additional protection and allow for easier handling, wherein the resulting buffered or furcated optical fibers typically have an outer diameter of about 900 μm.

Groups of coated optical fibers (e.g. four, eight, twelve, twenty-four, or more) optical fibers) may be held together using a matrix material or intermittent inter-fiber binders ("spiderwebs") to form "optical fiber ribbons" or "ribbonized optical fibers" to facilitate packaging within cables. For example, optical fiber ribbons are widely used in cables for high-capacity transmission systems. Some modern cables in large-scale data centers or fiber-to-the-home networks may contain up to 3,456 optical fibers, and cables having even higher optical fiber counts are under development. Optical fibers that form a ribbon are arranged in parallel in a linear (i.e., one-dimensional) array, with each fiber typically having a different color or marking scheme for ease of identification. FIG. 2 provides a cross-sectional view of a multi-fiber ribbon 112, which includes twelve optical fibers 114A-114L and a matrix 116 encapsulating the optical fibers 114A-114L. The optical fibers 114A-114L are substantially aligned with one another in a generally parallel configuration, preferably with an angular deviation of no more than one degree from true parallel at any position. Although twelve optical fibers 114A-114L are shown in the ribbon 112, it is to be appreciated that any suitable number of multiple fibers (but preferably at least four fibers) may be employed to form optical fiber ribbons suitable for a particular use.

Optical communication systems utilizing fiber optic cables are a substantial and fast-growing constituent of communication networks, due to the low signal losses and large transmission bandwidth inherent to optical fibers. Hyperscale data centers have emerged in recent years to support high bandwidth communications.

Hyperscale datacenters have been converging into leaf-spine architecture with low oversubscription (wherein oversubscription refers to the practice of connecting multiple devices to the same switch port to optimize switch port utilization). Low oversubscription is critical to support diverse applications such as social media, web searching, cloud services, and artificial intelligence/machine leaning/deep learning.

Leaf-spine network architecture is a two-layer network topology that is useful for datacenters that experience more east-west network traffic than north-south traffic. Leaf-spine networks utilize a leaf layer and a spine layer. The spine layer is made up of switches that perform routing, working as the network backbone. The leaf layer involves access switches that connect to endpoints. In leaf-spine architecture, every leaf switch is interconnected with every spine switch, permitting any server to communicate with any other server using no more than one interconnection switch path between any two leaf switches.

FIG. 3 shows an example of a non-blocking leaf-spine switch network 120 in a full mesh configuration, where each leaf switch 124 has a port connected to a port of each spine switch 122. In the particular implementation of FIG. 3, twelve spine switches 122 and twelve leaf switches 124 are provided, with each spine switch 122 and each leaf switch 124 having twelve ports, for a total of one hundred forty-four links that are provided by optical fibers 126. If each link includes a Small Form Pluggable (SFP) duplex fiber transceiver (having a dedicated transmit (TX) fiber and a dedicated receive (RX) fiber), then the number of optical fibers 126 connecting the spine switches 122 and leaf switches 124 would be increased to two hundred eighty-eight.

A base unit of mesh connectivity can be scaled to interconnect a larger number of switches, limited only by the port count of the switches. FIG. 4 shows a large number of spine switches 132 and leaf switches 134 that are organized in groups (e.g., spine switch groups 133A-133D and leaf switch groups 135A-135H, respectively) providing a super-mesh switch network configuration 130, with a multitude of optical fiber jumpers 136 providing full mesh connectivity between all the spine switches 132 and leaf switches 134. In this example, ninety-six leaf switches 134 are connectible to forty-eight spine switches 132 in a full mesh network using thirty-two base units of mesh connectivity, with each base unit having one hundred forty-four links. As will be apparent, any suitable number of switches can be chosen as the base unit in leaf-spine networks providing full mesh connectivity.

In typical practice, spine switches and leaf switches are physically located in different areas of a datacenter building. Structured cabling is essential to fiber management. Traditional straight trunk cables may be used to bring the fibers close to the spine switches, and then subunits are broken out to connect to individual switch ports. FIG. 5 is a schematic diagram showing a conventional leaf-spine switch network 140 having twelve spine switches 142 and twelve leaf switches 144 that are connected in a mesh configuration using optical cabling 145, with each leaf switch 144 having a port connected to a port of each spine switch 142. Starting from the leaf switches 144, multi-fiber subunits 146 are collected into a trunk segment 147 (typically including a jacket 147A) that spans a majority of a distance between the leaf switches 144 and the spine switches 142. Multi-fiber subunits 148 are broken out from an end of the trunk segment 147 closest to the spine switches 142, and thereafter individual fiber segments 149 are broken out separately from each multi-fiber subunit 148 to connect to a port of each respective spine switch 142. FIG. 5 shows that switch panels (e.g., including spine switches 142) for mesh networks remain highly chaotic and unmanageable. Individual optical fibers are actually harder to trace than would be suggested by FIG. 5, since such figure illustrates just one mesh connection unit, whereas in practice a multitude of mesh connection units would be provided in a typical leaf-spine network.

To enhance manageability and traceability of optical fibers in mesh network switch panels, one solution is to insert an optical shuffle box between a trunk cable and spine switch to provide a full mesh cross-connector pattern. An example of such a solution is shown in FIG. 6, which illustrates a leaf-spine switch network 150 that includes a trunk cable 155, an optical shuffle box 160, and jumpers 166A-166L arranged in a mesh configuration between twelve leaf switches 154 and twelve spine switches 152, with each leaf switch 154 having a port connected to a port of each spine switch 152. The trunk cable 155 includes a trunk segment 157 within a jacket 157A, and first and second groups of tubes 156, 158 (also known as fanout tubes). The optical shuffle box 160 includes a housing 161 that contains ports 162A-162L and ports 164A-164L. Multiple optical fiber connections 163 are provided within the shuffle box 160. Use of the optical shuffle box 160 to connect with the spine switches 152 entails use of a small number of simple multi-fiber jumper cables relative to the much larger number of single-fiber connections that would be required in the absence of an optical shuffle box (as shown in FIG. 5), thereby enabling a well-organized fiber layout at a switch rack supporting the spine switches 152. Within an optical shuffle box 160, distances between the ports 162A-162L and ports 164A-164L are typically substantially less than one meter.

Utilization of an optical shuffle box adds two multifiber connections (e.g., through each pair of serially arranged ports 162A to 164A through 162L to 164L) for each link, which increases cost and also increases optical insertion loss. Additionally, the large number of connection points per link can subject the network system to a higher probability of failure due to dust contamination in the connectors. Optical shuffle boxes also entail significant cost and consume valuable space inside switch racks.

In view of the foregoing, need remains in the art for cable assemblies that address the above-described and other limitations associated with conventional shuffle box connectivity solutions (e.g., for leaf-spine networking in datacenters), as well as associated fabrication methods.

SUMMARY

Aspects of the present disclosure provide fiber optic cable assemblies having integrated fiber shuffle regions that are suitable for mesh connectivity. An integrated fiber shuffle region is provided between first and second cable assembly sections that each include multiple tubes, with each tube containing a group of optical fibers, and a jacket being provided over the tubes in one or both of the cable assembly sections. The first cable assembly section includes M groups of N optical fibers and the second cable assembly section includes N groups of M optical fibers, with the fiber shuffle region providing a transition between the respective groups of optical fibers. The optical fibers remain in sequential order in groups at ends of the cable assembly sections, where the fibers may be ribbonized and/or connectorized. A method for fabricating a fiber optic cable assembly is also provided. The method comprises providing a first cable assembly section having M groups of N optical fibers (e.g., including ordered optical fibers $O1_{FIRST}$ to $OX_{FIRST}$ as a first group and ordered optical fibers $O1_{LAST}$ to $OX_{LAST}$ as a last group). The method further comprises, sequentially for each group of the M groups of N optical fibers, inserting segments of ordered optical fibers into a different receiving area of a fiber sorting fixture to form multiple linear arrays of ordered optical fibers, with a different linear array of ordered optical fibers within each receiving area. A first receiving area receives optical fibers $O1_{FIRST}$ to $O1_{LAST}$ in sequential order to form a first linear array of optical fibers, and a last receiving area receives optical fibers $OX_{FIRST}$ to $OX_{LAST}$ in sequential order to form a last linear array of optical fibers. The method further comprises separately fixing each linear array with adhesion elements to form rollable fixed arrays, and arranging each rollable fixed array in a non-linear position to yield multiple rollable, non-linearly positioned fixed arrays of optical fibers. The method further comprises threading the plurality of rollable, non-linearly positioned fixed arrays of optical fibers through second tubes as formative elements of a second cable assembly section that includes N groups of M optical fibers. The method further comprises enclosing a transition between the M groups of N optical fibers and the N groups of M optical fibers to form an integral fiber shuffle region of the fiber optic cable assembly.

In one embodiment of the disclosure, a fiber optic cable assembly is provided. The fiber optic cable assembly comprises first and second cable assembly sections. The first cable assembly section comprises M groups of N optical fibers and a plurality of first tubes, wherein in the first cable assembly section each group of the M groups of N optical fibers is contained in a respective first tube of the plurality of first tubes, and each group of the M groups of N optical fibers includes ordered optical fibers O1 to OX as members, and further wherein M≥4 and X≥4, such that a first group of the M groups of N optical fibers includes ordered optical fibers $O1_{FIRST}$ to $OX_{FIRST}$, and a last group of the M groups of N optical fibers includes ordered optical fibers $O1_{LAST}$ to $OX_{LAST}$. The second cable assembly section comprises N groups of M optical fibers and a plurality of second tubes, wherein in the second cable assembly section each group of the N groups of M optical fibers is contained in a respective second tube of the plurality of second tubes, and each group of the N groups of M optical fibers includes one member from each group of the M groups of N optical fibers with a like suffix 1 to X among optical fibers O1 to OX in sequential order, such that a first group of the N groups of M optical fibers includes ordered optical fibers $O1_{FIRST}$ to $O1_{LAST}$, and a last group of the N groups of M optical fibers includes ordered optical fibers $OX_{FIRST}$ to $OX_{LAST}$. The fiber optic cable assembly further comprises a fiber shuffle region arranged between the first cable assembly section and the second cable assembly section, wherein the fiber shuffle region provides a transition between the M groups of N optical fibers and the N groups of M optical fibers. The fiber optic cable assembly further comprises a plurality of first ribbon sections, wherein each group of the M groups of N optical fibers is contained in a respective ribbon section of the plurality of first ribbon sections, and the first cable assembly section is arranged between the fiber shuffle region and the plurality of first ribbon sections. The fiber optic cable assembly additionally comprises at least one of: (i) a first jacket containing the plurality of first tubes, or (ii) a second jacket containing the plurality of second tubes.

In accordance with another embodiment of the disclosure, a fiber optic cable assembly is provided. The fiber optic cable assembly comprises first and second cable assembly sections. The first cable assembly section comprises M groups of N optical fibers and a plurality of first tubes, wherein each group of the M groups of N optical fibers is contained in a respective first tube of the plurality of first tubes, and each group of the M groups of N optical fibers includes ordered optical fibers O1 to OX as members, and further wherein M≥4 and X≥4, such that a first group of the M groups of N optical fibers includes ordered optical fibers $O1_{FIRST}$ to $OX_{FIRST}$, and a last group of the M groups of N optical fibers includes ordered optical fibers $O1_{LAST}$ to $OX_{LAST}$. The second cable assembly section comprises N groups of M optical fibers and a plurality of second tubes, wherein each group of the N groups of M optical fibers is contained in a respective second tube of the plurality of second tubes, and each group of the N groups of M optical fibers includes one member from each group of the M groups of N optical fibers with a like suffix 1 to X among optical fibers O1 to OX in sequential order, such that a first group of the N groups of M optical fibers includes ordered optical fibers $O1_{FIRST}$ to $O1_{LAST}$, and a last group of the N groups of M optical fibers includes ordered optical fibers $OX_{FIRST}$ to $OX_{LAST}$. The fiber optic cable assembly further comprises a fiber shuffle region arranged between the first cable assembly section and the second cable assembly section, wherein the fiber shuffle region provides a transition between the M groups of N optical fibers and the N groups of M optical fibers. The fiber optic cable assembly additionally comprises a first plurality of connectors terminating the M groups of N optical fibers of the first cable assembly section, and a second plurality of connectors terminating the N groups of M optical fibers of the second cable assembly section. The fiber optic cable assembly further comprises at least one of: (i) a first jacket containing the plurality of first tubes, or (ii) a second jacket containing the plurality of second tubes.

In accordance with another embodiment of the disclosure, a method for fabricating a fiber optic cable assembly is provided. The method comprises providing M groups of N optical fibers in a first cable assembly section, with each group of the M groups of N optical fibers including ordered optical fibers O1 to OX as members, and wherein M≥4 and X≥4, such that a first group of the M groups of N optical fibers includes ordered optical fibers $O1_{FIRST}$ to $OX_{FIRST}$, and a last group of the M groups of N optical fibers includes ordered optical fibers $O1_{LAST}$ to $OX_{LAST}$. The method further comprises, sequentially for each group of the M groups of N optical fibers, inserting a segment of each ordered optical fiber into a different receiving area of a plurality of receiving areas of a fiber sorting fixture to form a plurality of linear arrays of ordered optical fibers including a different linear array of ordered optical fibers within each receiving area, wherein a first receiving area of the plurality of receiving areas receives optical fibers $O1_{FIRST}$ to $O1_{LAST}$ in sequential order to form a first linear array of the plurality of linear arrays of optical fibers, and a last receiving area of the plurality of receiving areas receives optical fibers $OX_{FIRST}$ to $OX_{LAST}$ in sequential order to form a last linear array of the plurality of linear arrays of optical fibers. The method additionally comprises, for each linear array of the plurality of linear arrays of optical fibers, separately fixing at least one segment of the linear array with at least one adhesion element to form a rollable fixed array of optical fibers, and arranging the rollable fixed array of optical fibers in a non-linear position, thereby yielding a plurality of rollable, non-linearly positioned fixed arrays of optical fibers from the plurality of linear arrays of optical fibers. The method further comprises threading the plurality of rollable, non-linearly positioned fixed arrays of optical fibers through a plurality of second tubes as formative elements of a second cable assembly section including N groups of M optical fibers. The method additionally comprises enclosing a transition between the M groups of N optical fibers of the first cable assembly section and the N groups of M optical fibers of the second cable assembly section to form an integral fiber shuffle region of the fiber optic cable assembly.

Additional features and advantages will be set forth in the detailed description that follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

FIG. 14 is a schematic cross-sectional view illustration of a portion of a fiber optic cable assembly according to one embodiment, showing an integral fiber shuffle region arranged within a containment tube that receives optical fibers as well as segments of tubes of first and second cable assembly sections.

FIG. 16 is a perspective view illustration of a fiber optic cable assembly according to one embodiment, showing an integral fiber shuffle region arranged within a containment tube that receives optical fibers as well as segments of tubes of first and second cable assembly sections.

FIG. 17A is a perspective view of an example of a multi-fiber push-on (MPO)-type fiber optic connector incorporating multiple optical fibers retained in linearly arranged bores defined in a ferrule.

FIG. 17B is an exploded view of the fiber optic connector of FIG. 17A.

DETAILED DESCRIPTION

Figure 1:
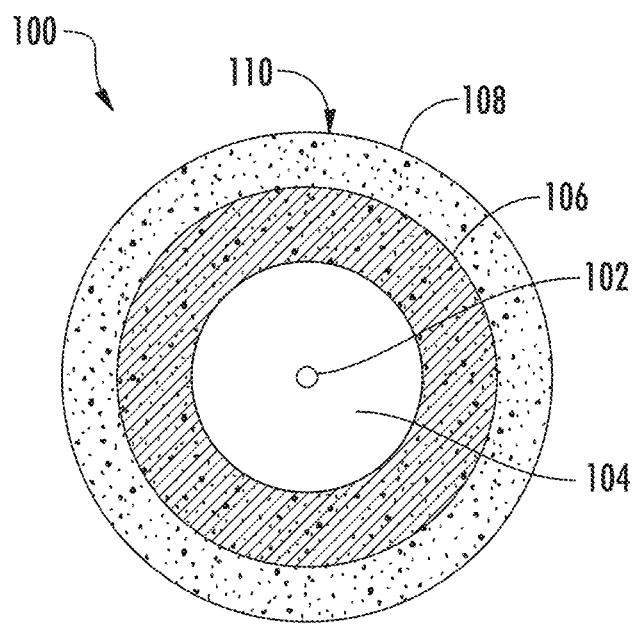
FIG. 1 is a cross-sectional view of a conventional coated optical fiber.
Figure 2:
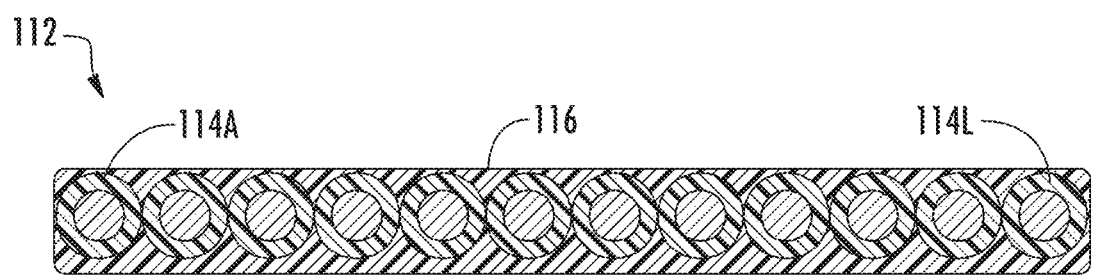
FIG. 2 is a cross-sectional view of a conventional multi-fiber ribbon including twelve optical fibers.
Figure 3:
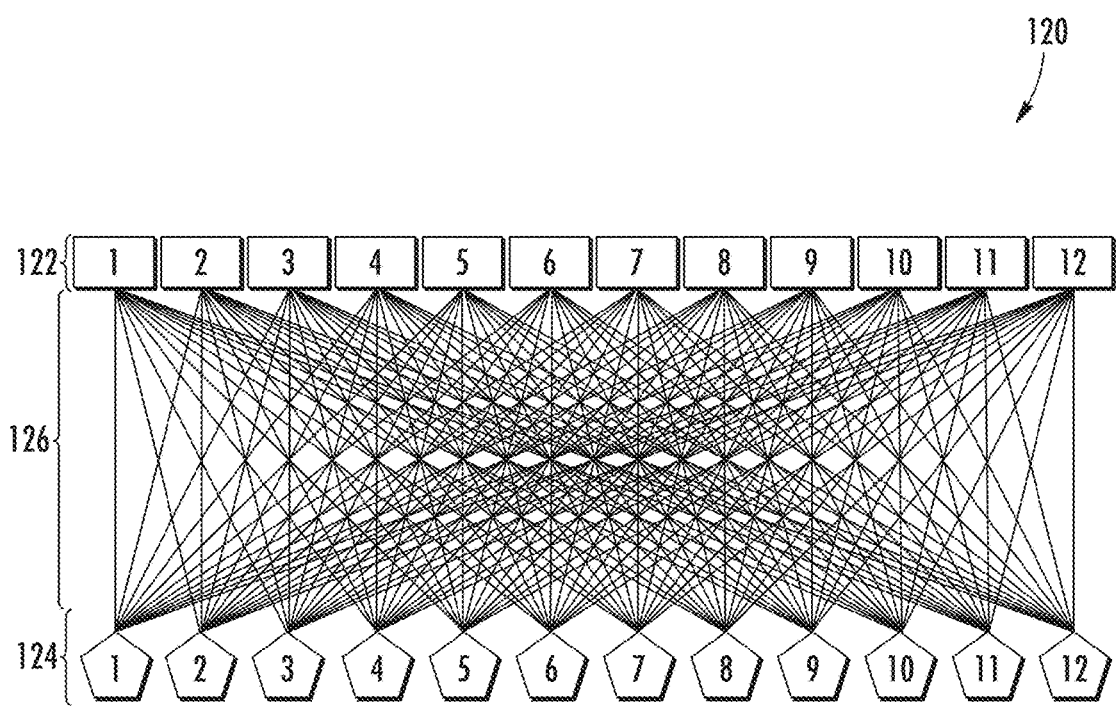
FIG. 3 is a schematic diagram showing a conventional, non-blocking leaf-spine switch network in a full mesh configuration, with each leaf switch having a port connected to a port of each spine switch.
Figure 4:
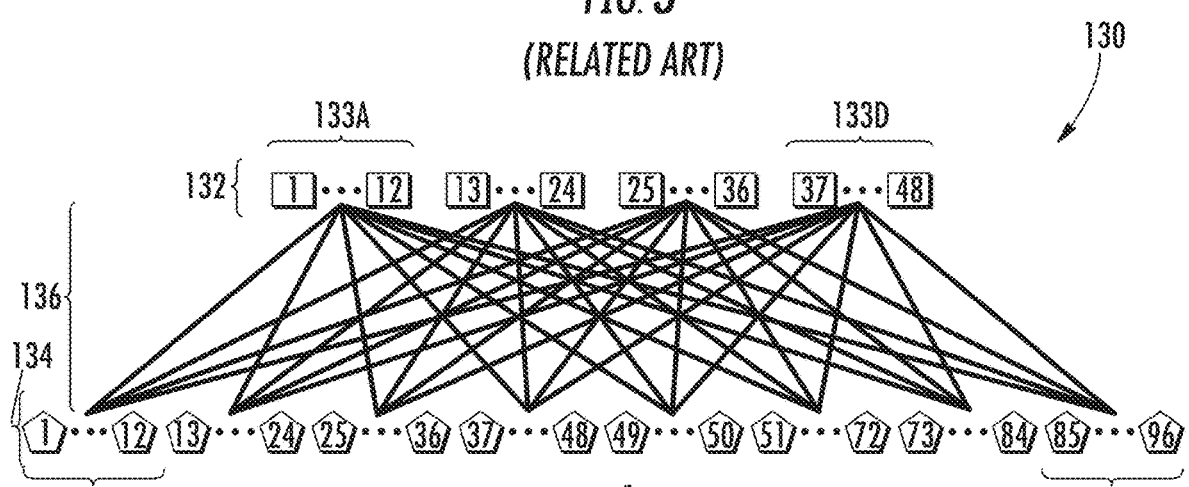
FIG. 4 is a schematic diagram showing a conventional super-mesh switch network configuration with ninety-six leaf switches being connected to forty-eight spine switches in a full mesh network using thirty-two base units of mesh connectivity.
Figure 5:
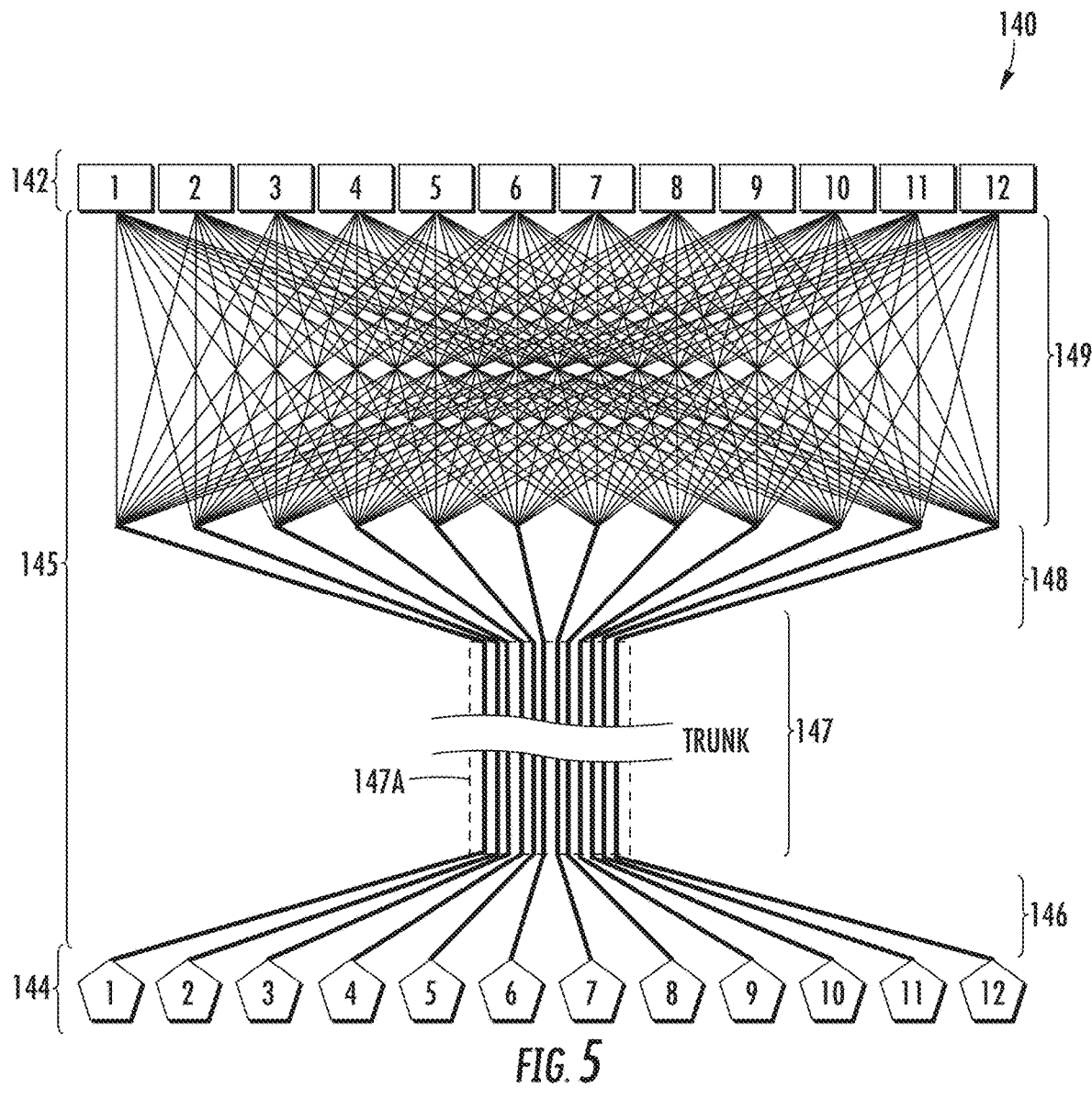
FIG. 5 is a schematic diagram showing a conventional leaf-spine switch network including a trunk segment having twelve groups of twelve optical fibers arranged in a mesh configuration between twelve leaf switches and twelve spine switches, with each leaf switch having a port connected to a port of each spine switch.
Figure 6:
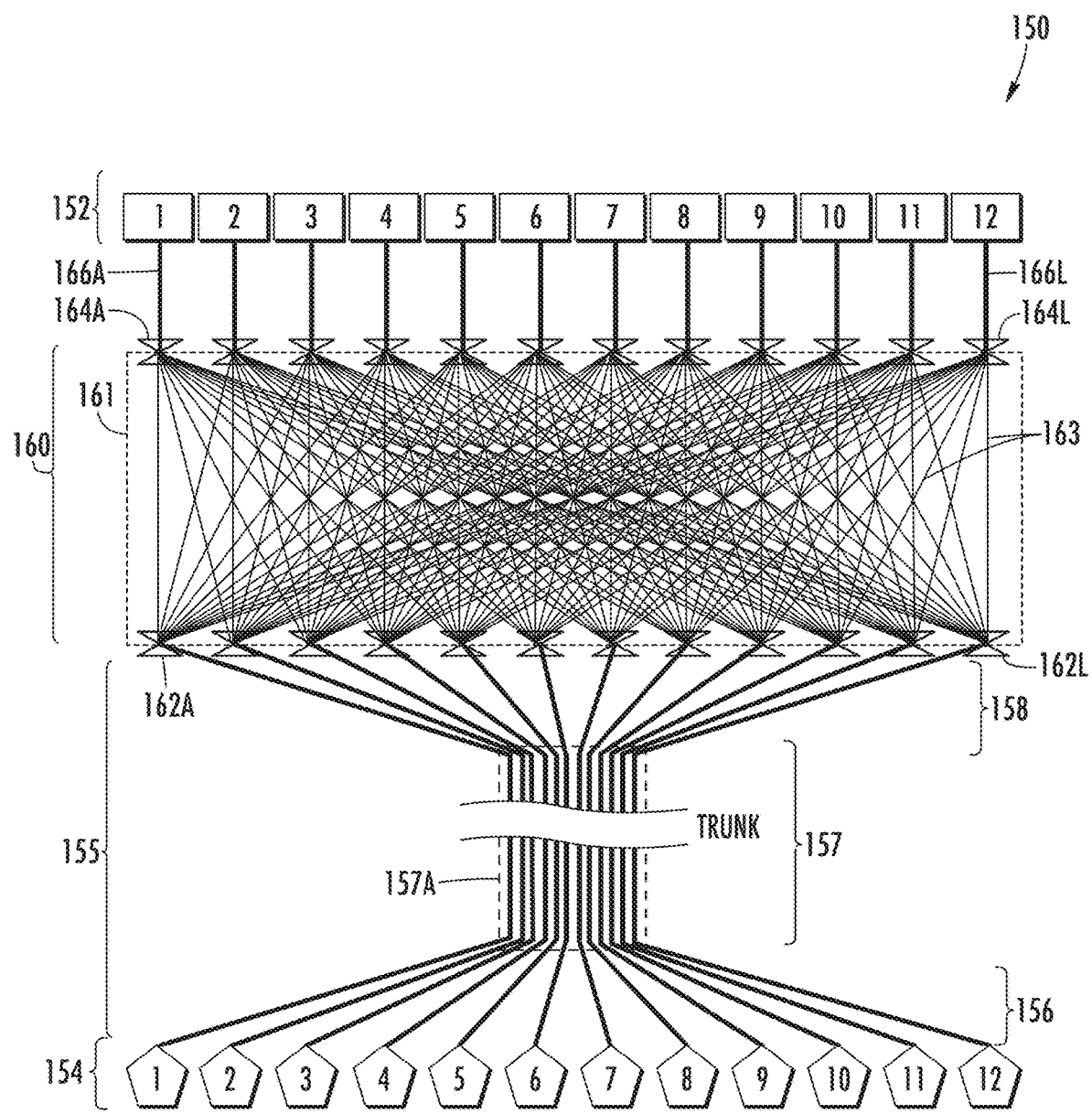
FIG. 6 is a schematic diagram showing a conventional leaf-spine switch network including a trunk cable and an optical shuffle box arranged in a mesh configuration between twelve leaf switches and twelve spine switches, with each leaf switch having a port connected to a port of each spine switch.

Various embodiments will be further clarified by examples in the description below. In general, the description relates to fiber optic cable assemblies and associated fabrication methods permitting an integrated fiber shuffle region to be provided between a first cable assembly section and a second cable assembly section, with each of the first and second cable assembly sections including multiple tubes each containing a group of optical fibers, and with a jacket being provided over the multiple tubes in at least one of the first cable assembly section or the second cable assembly section. The first cable assembly section includes M groups of N optical fibers and the second cable assembly section includes N groups of M optical fibers, with the fiber shuffle region providing a transition between the respective groups of optical fibers, and with the optical fibers remaining in sequential order at ends of the first and second cable assembly sections. In the first cable assembly section, each group of the M groups of N optical fibers includes ordered optical fibers O1 to OX as members, wherein M≥4 and X≥4, such that a first group of the M groups of N optical fibers includes ordered optical fibers $O1_{FIRST}$ to $OX_{FIRST}$, and a last group of the M groups of N optical fibers includes ordered optical fibers $O1_{LAST}$ to $OX_{LAST}$. In the second cable assembly section, each group of the N groups of M optical fibers includes one member from each group of the M groups of N optical fibers with a like suffix 1 to X among optical fibers O1 to OX in sequential order, such that a first group of the N groups of M optical fibers includes ordered optical fibers $O1_{FIRST}$ to $O1_{LAST}$, and a last group of the N groups of M optical fibers includes ordered optical fibers $OX_{FIRST}$ to $OX_{LAST}$. The fiber shuffle region provides a transition between the M groups of N optical fibers of the first cable assembly section and the N groups of M optical fibers of the second cable assembly section. Proximate to an end of one or both of the first and second cable assembly sections, multiple ribbon sections and/or optical connectors may be provided.

Fiber optic cable assemblies including integrated fiber shuffle regions according to various embodiments herein are suitable for making optical cross-connections, including (but not limited to) providing mesh connectivity in leaf-spine networks.

In certain embodiments, a fiber optic cable assembly as disclosed herein is useable as a trunk cable of any suitable length, such as at least about 5 meters (m), at least about 10 m, at least about 25 m, at least about 50 m, at least about 100 m, at least about 250 m, at least about 500 m, or at least about 1000 m, wherein in certain embodiments the preceding values may optionally be bounded by an upper limit of 2000 m.

In certain embodiments, an integrated fiber shuffle region is compact in length and/or width, facilitating its use in optical fiber trunk cables or the like that may be pulled within conduit, cable routing trays, cable routing troughs, or the like. Compact length dimensions are beneficial to promote cable flexibility and permit a cable to be routed through turns. Compact width dimensions are beneficial to permit a cable to be routed through small openings and/or avoid being snagged on other cables during a cable pulling step. In certain embodiments, an integrated fiber shuffle region as disclosed herein may have a maximum length (e.g., in a direction parallel to an optical axis of optical fibers through the cable assembly) of no greater than about 20 centimeters (cm), no greater than about 10 cm, no greater than about 5 cm, or no greater than about 2.5 cm. Comparatively longer lengths may be necessary when the number of optical fibers becomes large within a fiber shuffle region to ensure that routing of optical fibers through the fiber shuffle region does not cause optical fibers to undergo impermissibly small radius bends that may negatively affect optical fiber reliability. In certain embodiments, a maximum width of an integrated fiber shuffle region of a fiber optic cable assembly may be defined relative to a width $W_J$ of a cable jacket (e.g., a jacket that surrounds subunit tubes of the cable assembly), such as a width of no greater than about $1.6 \times W_J$, no greater than about $1.5 \times W_J$, no greater than about $1.25 \times W_J$, no greater than about $1.15 \times W_J$, no greater than about $1.1 \times W_J$, no greater than about $1.05 \times W_J$, or no greater than about $1 \times W_J$.

In certain embodiments, an integrated fiber shuffle region of a fiber optic cable assembly as disclosed herein includes a tubular body defining a cavity that contains a transition between M groups of N optical fibers of a first cable assembly section and N groups of M optical fibers of a second cable assembly section. Such a tubular body, which may also be referred to as a furcation, may include any desirable cross-sectional shape, such as round, oval, rectangular, polygonal, or the like. In certain embodiments, one or both ends of the tubular body may be sealed with a plug and/or a sealant. In certain embodiments, an encapsulant material is provided within the cavity and arranged in contact with exterior portions of the M groups of N optical fibers and the N groups of M optical fibers. In certain embodiments, the encapsulant material is configured to remain solid over an entire anticipated operating range of a fiber optic cable assembly (e.g., from −10° C. to 100° C. or any other suitable temperature range). Examples of suitable encapsulant materials include epoxies, thermoplastic materials, and curable adhesive materials (e.g., of photocurable, thermally curable, and/or chemically curable varieties). In certain embodiments, an encapsulant material is supplied in liquid form to the cavity of tubular body containing an integral fiber shuffle region, and the encapsulant material is cured or otherwise solidified to form a solid encapsulant that contacts exterior portions of the M groups of N optical fibers and the N groups of M optical fibers within the cavity.

In certain embodiments, an integral fiber shuffle region may include a solid material encapsulating exterior portions of the M groups of N optical fibers and the N groups of M optical fibers without being contained in a tubular body. In certain embodiments, the solid material may be formed by molding (e.g., low pressure molding) around a fiber transition region in contact with exterior portions of the M groups of N optical fibers and the N groups of M optical fibers.

In certain embodiments, a fiber optic cable assembly as disclosed herein includes M groups of N optical fibers in a first cable assembly section, and N groups of M optical fibers in a second cable assembly section, wherein various values of M and N may be used. In certain embodiments, M equals N. In certain embodiments, M does not equal N. In certain embodiments, M and N are both at least four. In certain embodiments, at least one of M or N is at least eight, at least twelve, at least sixteen, or at least twenty-four. In certain embodiments, M=1.5N, M=2N, M=3N, N=1.5M, N=2M, or N=3M. In certain embodiments, each tube arranged in a cable assembly section contains multiple (e.g., 2, 4, 6, 16, or more) optical fibers therein.

In certain embodiments, the first and/or second cable assembly sections may include multiple tubes each containing groups of optical fibers, wherein portions of such tubes extend into a fiber shuffle region. In certain embodiments, the first and/or second cable assembly sections of a fiber optic cable assembly may include strength members (e.g., of fibrous, string-like, or yarn-like material, such as aramid yarn) that extend in a direction generally parallel with an optical axis of optical fibers within the respective cable assembly sections, wherein portions of the strength members extend into a fiber shuffle region. In certain embodiments, encapsulant material of such a fiber shuffle region may be arranged in contact with tube end segments, jacket end segments, and/or strength members of one or both of the first and second cable assembly sections that extend into the fiber shuffle region. Encapsulation of strength members within the fiber shuffle region may enhance the tensile strength of a resulting fiber optic cable assembly, which may be beneficial when pulling a trunk cable incorporating an integrated fiber shuffle region over a long distance and/or through a tortuous path as may be experienced by a cable within conduits, cable trays, or cable troughs. Encapsulation of tube end segments and/or jacket end segments within a fiber shuffle region may beneficially serve to secure respective end segments and prevent their separation from the fiber shuffle region, thereby enhancing environmental protection of optical fibers contained therein, and potentially increasing tensile strength of the cable assembly.

Fiber optic cable assemblies according to certain embodiments disclosed herein may include groups of optical fibers arranged as tight buffered optical fibers, loose tube optical fibers, ribbonized optical fibers (including flat ribbons or rollable ribbons), or combinations thereof (e.g., at opposing ends of a fiber optic cable assembly). In certain embodiments, tubes extending from a jacketed trunk segment or from an integral fiber shuffle region may include optical fibers according to any one or more of the preceding formats. In certain embodiments, optical fiber groups may be sequentially ribbonized proximate to ends thereof and connectorized (e.g., with single-fiber or multi-fiber connectors).

In certain embodiments, a first cable assembly section includes a plurality of first tubes, and in the first cable assembly section, each group of the M groups of N optical fibers is loosely contained in a respective first tube of the plurality of first tubes. As used in this disclosure, "loosely contained" or "loosely arranged" refers to groups of optical fibers being devoid of a matrix material encapsulating all optical fibers of a particular group over at least some common length of the optical fibers. In certain embodiments, "loosely contained" or "loosely arranged" groups of optical fibers may include groups of optical fibers that are intermittently bound (i.e., not fully encapsulated). In certain embodiments, a second cable assembly section includes a plurality of second tubes, and in the second cable assembly section, each group of the N groups of M optical fibers is loosely contained in a respective second tube of the plurality of second tubes. Such tubes may include any desirable cross-sectional shape, such as round, oval, rectangular (e.g., square), polygonal, or the like.

Depending on tube dimensions, it may be difficult to thread ribbonized optical fibers through a plurality of first tubes or a plurality of second tubes during fabrication of a fiber optic cable assembly as disclosed herein. To address this issue, in certain embodiments, (i) each tube of the plurality of first tubes in a first cable assembly section is rectangular or square in cross-section, and each group of the M groups of N optical fibers is ribbonized within a respective first tube of the plurality of first tubes; and/or (ii) each tube of the plurality of second tubes in a second cable assembly section is rectangular or square in cross-section, and each group of the N groups of M optical fibers is ribbonized within a respective second tube of the plurality of second tubes.

In certain embodiments, groups of non-ribbonized optical fibers are arranged in ordered linear arrays along at least one or more lengthwise segments of such groups within respective tubes of first and/or second cable assembly sections. According to such embodiments, the positioning of optical fibers within each linear array may be maintained using at least one adhesion element that may stick to the arrayed optical fibers to form a joined or "fixed" array of optical fibers. Such fixed arrays are preferably rollable in character to form rollable fixed arrays, wherein a rollable fixed array may include arrayed optical fibers in a linear one-dimensional conformation when in an unrolled position, and may include arrayed optical fibers in a non-linear conformation (e.g., folded, encircled, or spiral-rolled) when in a rolled position. In certain embodiments, an adhesion element may include a single-sided self-adhesive material including a carrier (e.g., of one or more polymers or metals) and an adhesive layer bound thereto. Multiple adhesion elements may be used at spaced-apart locations to form intermittently-fixed array segments. Use of one or more adhesion elements to maintain positioning of optical fibers in an array permits a rollable fixed array of optical fibers to be inserted through a tube (e.g., in a rolled position) during a cable assembly fabrication step and then manipulated into an unrolled position following such insertion without any need for re-sorting optical fibers (e.g., to permit connectorization). In certain embodiments, an adhesion element includes a plastically deformable adhesion element, such as a metal foil (e.g., copper foil) tape. Use of a plastically deformable adhesion element permits at least a segment of a rollable fixed optical fiber array to be arranged in a non-linear (e.g., folded, encircled, or spiral-rolled) position before threading the rollable fixed array through a tube, thereby reducing the maximum width of the rollable fixed optical fiber array (and reducing the internal width requirement for the bore of the tube) to ease passage through the tube. After the rollable fixed array segment arranged in a non-linear position is threaded through a tube, the rollable fixed array segment may be unfolded or unrolled to return the rollable fixed array segment to a linear shape. Thereafter, an end portion of the optical fiber array may be ribbonized and/or connectorized.

In certain embodiments, within each group of optical fibers in the first cable assembly section, each optical fiber comprises a colored outer coating or surface of a same color scheme, and within each group of optical fibers in the second cable assembly section, each optical fiber comprises a colored outer coating or surface of a same color scheme. Each of the first and second cable assembly sections may include fiber groups contained within multiple tubes. In such an embodiment, an integrated fiber shuffle region arranged between the first and second cable assembly sections serves to distribute one fiber from each first tube into a different single tube of the multiple second tubes. If each first tube contains optical fibers of different colors or marking schemes, then each second tube contains optical fibers of a single color or marking scheme, with the color or marking scheme of fibers in different second tubes differing from one another. In certain embodiments, each tube in the first cable assembly section of a fiber optic cable assembly has a different marking scheme and/or color scheme, and each tube in the second cable assembly section has a different marking scheme and/or color scheme.

In certain embodiments, each end of first and/or second cable assembly sections may be preterminated with a single multi-fiber connector, multiple multi-fiber connectors, multiple single-fiber connectors, or harnesses of any suitable configuration.

It is to be emphasized that integrated fiber shuffle regions according to some embodiments are devoid of any splices and interconnects between segments of any optical fibers (e.g., between segments of the M groups of N optical fibers and the N groups of M optical fibers). Such embodiments are enabled by the processing techniques according to this disclosure. In this regard, fiber optic cable assemblies incorporating these integrated fiber shuffle regions avoid the need for internal connections that would increase optical insertion loss and eliminate any possibility of dust contamination.

Having introduced the preceding concepts, additional features of embodiments disclosed herein will be described with reference to the accompanying figures.

Figure 7:
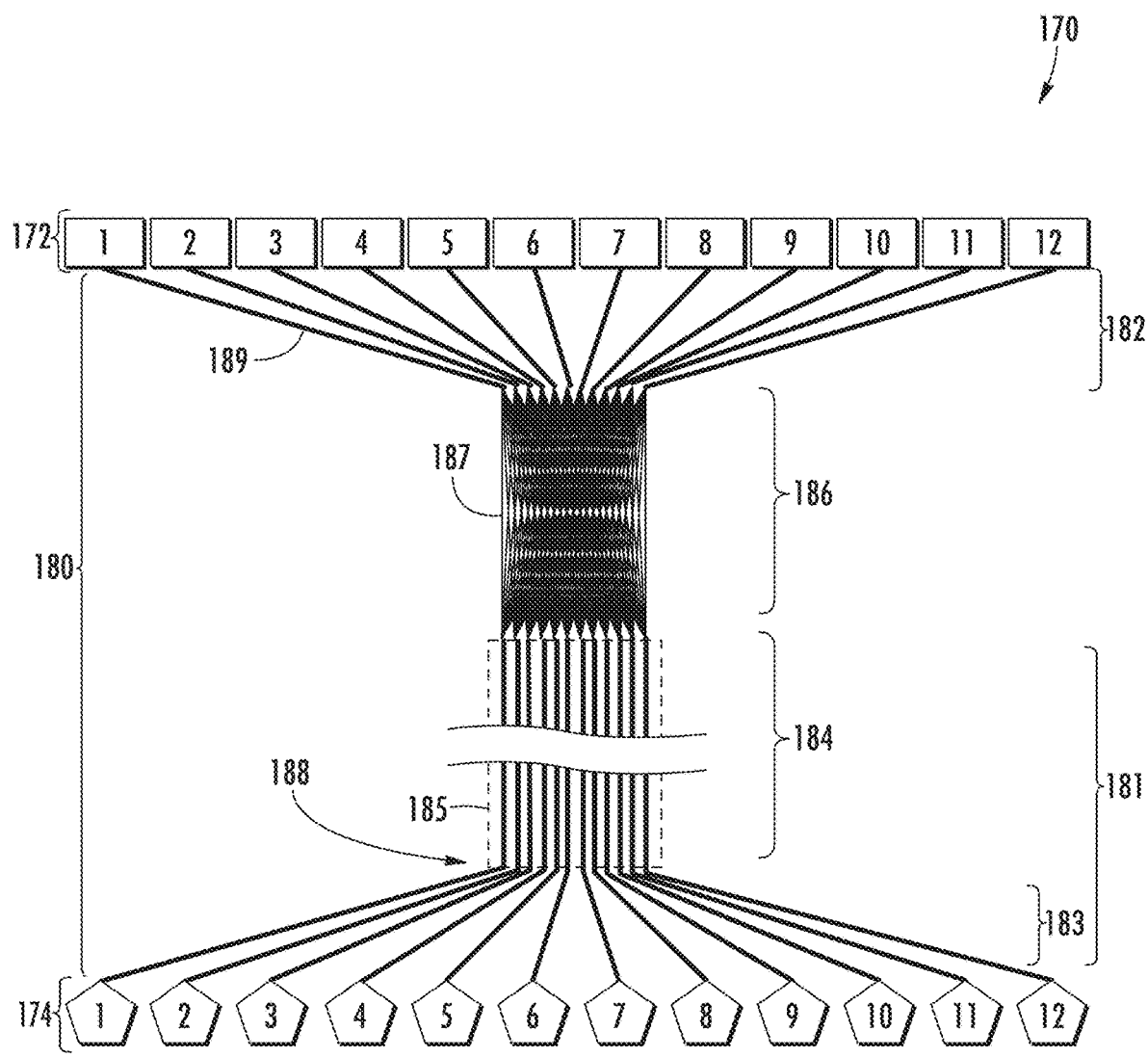
FIG. 7 is a schematic diagram showing a fiber optic cable assembly including an integrated fiber shuffle region according to one embodiment, with the fiber optic cable assembly serving as a trunk providing a full mesh configuration between twelve leaf switches and twelve spine switches, such that each leaf switch has a port connected to a port of each spine switch.

FIG. 7 is a schematic diagram showing a fiber optic cable assembly 180 including an integrated fiber shuffle region 186 according to one embodiment, with the fiber optic cable assembly 180 serving as a trunk providing a full mesh configuration between twelve leaf switches 174 and twelve spine switches 172 as part of a leaf-spine network 170. In the leaf-spine network 170, the fiber optic cable assembly 180 permits a port of each leaf switch 174 to be connected to a port of each spine switch 172. The integrated fiber shuffle region 186 is provided between a first cable assembly section 181 and a second cable assembly section 182. The first cable assembly section 181 includes multiple groups of optical fibers separately arranged in multiple first tubes 183 that are further contained within a jacket 185 along the length of a trunk segment 184. A transition structure 188 may be arranged at one end of the trunk segment 184, with segments of individual first tubes 183 external to the trunk segment 184 being routed to the leaf switches 174. The trunk segment 184 may have any suitable length for the end use, such as in one or more length ranges specified previously herein. The integrated fiber shuffle region 186 is arranged at an opposing end of the trunk segment 184, with the integrated fiber shuffle region 186 serving to distribute one fiber from each first tube 183 into a different single tube 189 of the second cable assembly section 182. The integrated fiber shuffle region 186 includes a body 187, which may include solid material encapsulating exterior portions of the optical fibers in the integrated fiber shuffle region 186.

Figure 8A:
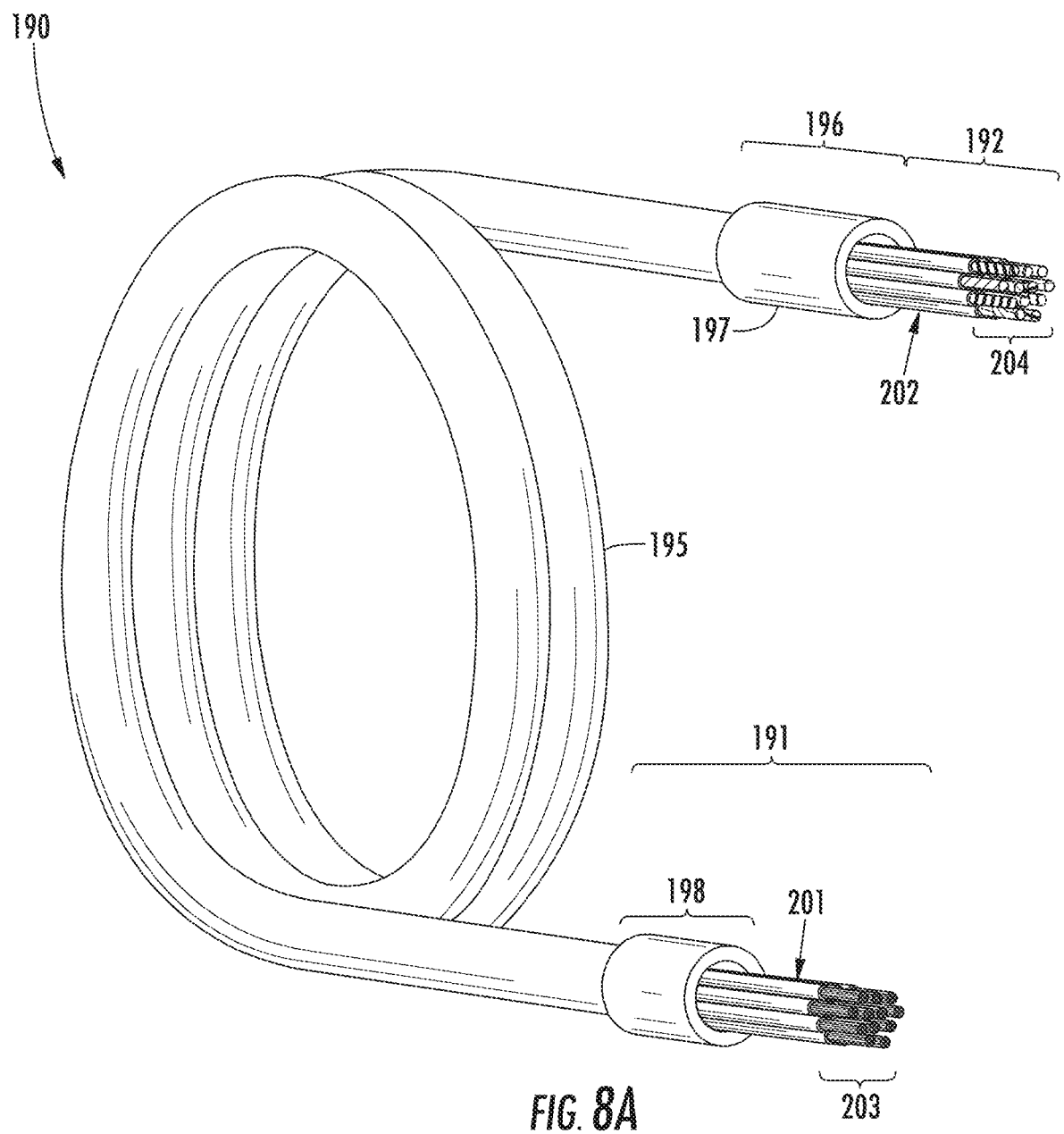
FIG. 8A is a perspective view illustration of a fiber optic cable assembly including an integrated fiber shuffle region according to one embodiment, with a first end portion having twelve groups of multiple fibers of different colors and/or markings contained in twelve first tubes, a second end portion having twelve groups of multiple fibers each having the same intra-group color contained in twelve second tubes, and a jacket containing portions of the first tubes.

FIG. 8A is a perspective view illustration of a fiber optic cable assembly 190 according to one embodiment, including an integrated fiber shuffle region 196 arranged between a first cable assembly section 191 and a second cable assembly section 192. The fiber optic cable assembly 190 has a first end portion (bottom of FIG. 8A) with twelve groups of multiple optical fibers 203 that each include optical fibers having different external colors and/or markings. The twelve groups of multiple optical fibers 203 respectively extend from twelve first tubes 201. The twelve first tubes 201 extend from a reinforced transition segment 198 arranged at one end of a trunk segment having a jacket 195 that contains the first tubes 201 therein. The fiber optic cable assembly 190 also includes a second end portion (top of FIG. 8A) with twelve groups of multiple optical fibers 204 having different external colors and/or markings between respective groups, but the same external color and/or marking within each individual group. The twelve groups of multiple optical fibers 204 respectively extend from twelve second tubes 202. The twelve second tubes 202 extend from the integrated fiber shuffle region 196, which includes a body 197 having a solid material that encapsulates external surfaces of optical fibers from the first cable assembly section 191 and the second cable assembly section 192. Although not shown in FIG. 8A, it is to be appreciated that respective groups of optical fibers 203, 204 proximate to ends of the fiber optic cable assembly 190 may be ribbonized and/or connectorized in certain embodiments. Thus, the groups of optical fibers 203 may each be ribbonized to form a plurality of first ribbon sections, and/or the groups of optical fibers 204 may each be ribbonized to form second ribbon sections.

Figure 8C:
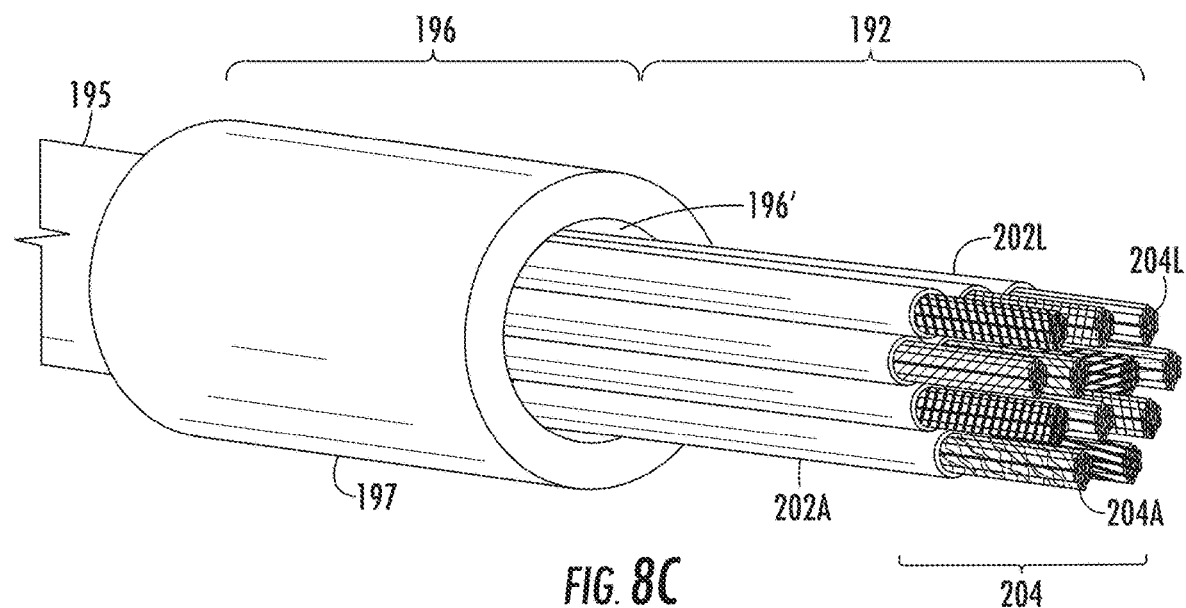
FIG. 8C is a perspective view illustration of the second end portion and integrated fiber shuffle region of the fiber optic cable assembly of FIG. 8A.
Figure 8B:
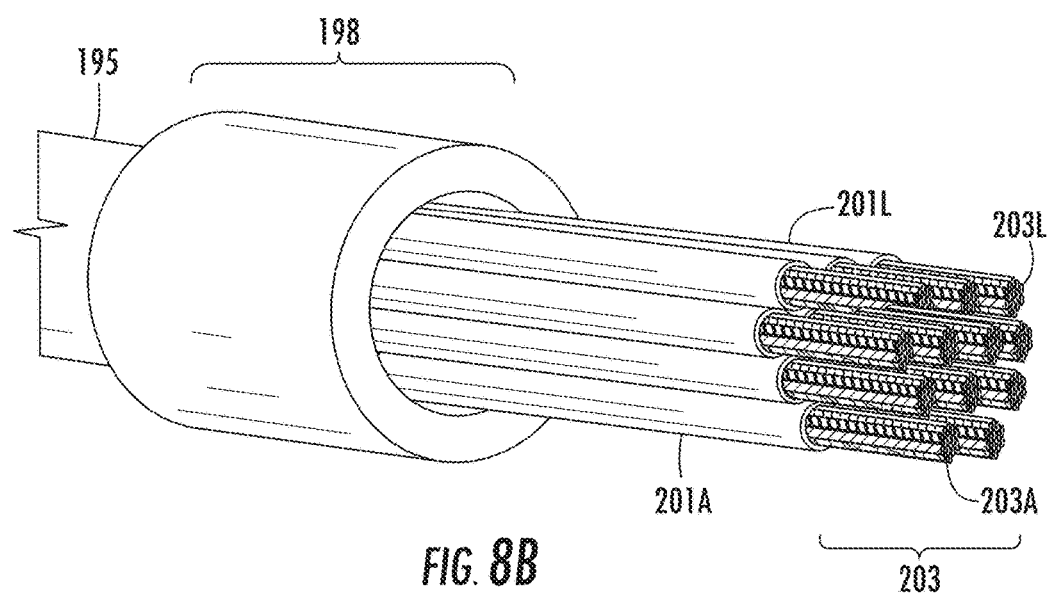
FIG. 8B is a perspective view illustration of the first end portion and a reinforced jacket termination portion of the fiber optic cable assembly of FIG. 8A.

FIG. 8B is a magnified perspective view of the first end portion of the fiber optic cable assembly 190 of FIG. 8A. At one end of the trunk segment bounded by the jacket 195, the reinforced transition segment 198 defines a cavity through which twelve first tubes 201A-201L extend. Each first tube 201A-201L contains a corresponding group of multiple optical fibers 203A-203L (collectively, optical fibers 203). The optical fibers 203 have different external colors and/or markings within each group 203A-203L, but each group 203A-203L has the same combination of differently colored and/or marked optical fibers 203. In certain embodiments, each first tube 201A-201L may be provided with a different color scheme and/or marking scheme. In certain embodiments, each group of multiple optical fibers 203A-203L includes twenty-four optical fibers, consisting of twelve transmit optical fibers and twelve receive optical fibers, accommodating twelve communication links.

FIG. 8C is a magnified perspective view of the second end portion of the fiber optic cable assembly 190 of FIG. 8A, including the second cable assembly section 192 and the integrated fiber shuffle region 196, which is arranged at an end of the trunk segment bounded by the jacket 195. The integrated fiber shuffle region 196 includes a body 197 defining a cavity 196' through which twelve second tubes 202A-202L extend. Each second tube 202A-202L contains a corresponding group of multiple optical fibers 204A-204L (collectively, optical fibers 204). The optical fibers 204 have different external colors and/or markings between respective groups 204A-204L, but the same external color and/or marking within each individual group 204A-204L. In certain embodiments, each second tube 202A-202L may be provided with a different color scheme and/or marking scheme. In certain embodiments, each group of multiple optical fibers 204A-204L includes twenty-four optical fibers, consisting of twelve transmit optical fibers and twelve receive optical fibers, accommodating twelve communication links.

It is to be appreciated that optical fibers 203 in each group of the first group of multiple optical fibers 203A-203L and optical fibers 204 in each group of the second group of multiple optical fibers 204A-204L may be provided and fixed in a specific sequence or order, thereby permitting the respective fiber groups to be ribbonized and/or connectorized without any need for resorting or re-ordering optical fibers. Such order may be maintained by any suitable member(s) connecting or joining the groups of optical fibers 203A-203L, 204A-204L within the corresponding tubes 201A-201L, 202A-202L, or as discussed below, at least connecting the groups of optical fibers 203A-203L, 204A-204L as they are being inserted through the corresponding tubes 201A-201L, 202A-202L. Examples of suitable members for connecting groups of optical fibers include adhesion elements (e.g., copper foil tape) placed at intermittent locations and inter-fiber binders (not shown) placed intermittently between the optical fibers (e.g., as may be used to yield rollable ribbons or the like).

Although the embodiment of FIGS. 8A-8C illustrate the use of fiber groups that may be loosely arranged within tubes, certain embodiments provided herein may utilize ribbonized optical fibers at or downstream of opposing ends of a fiber shuffle region.

Figure 9:
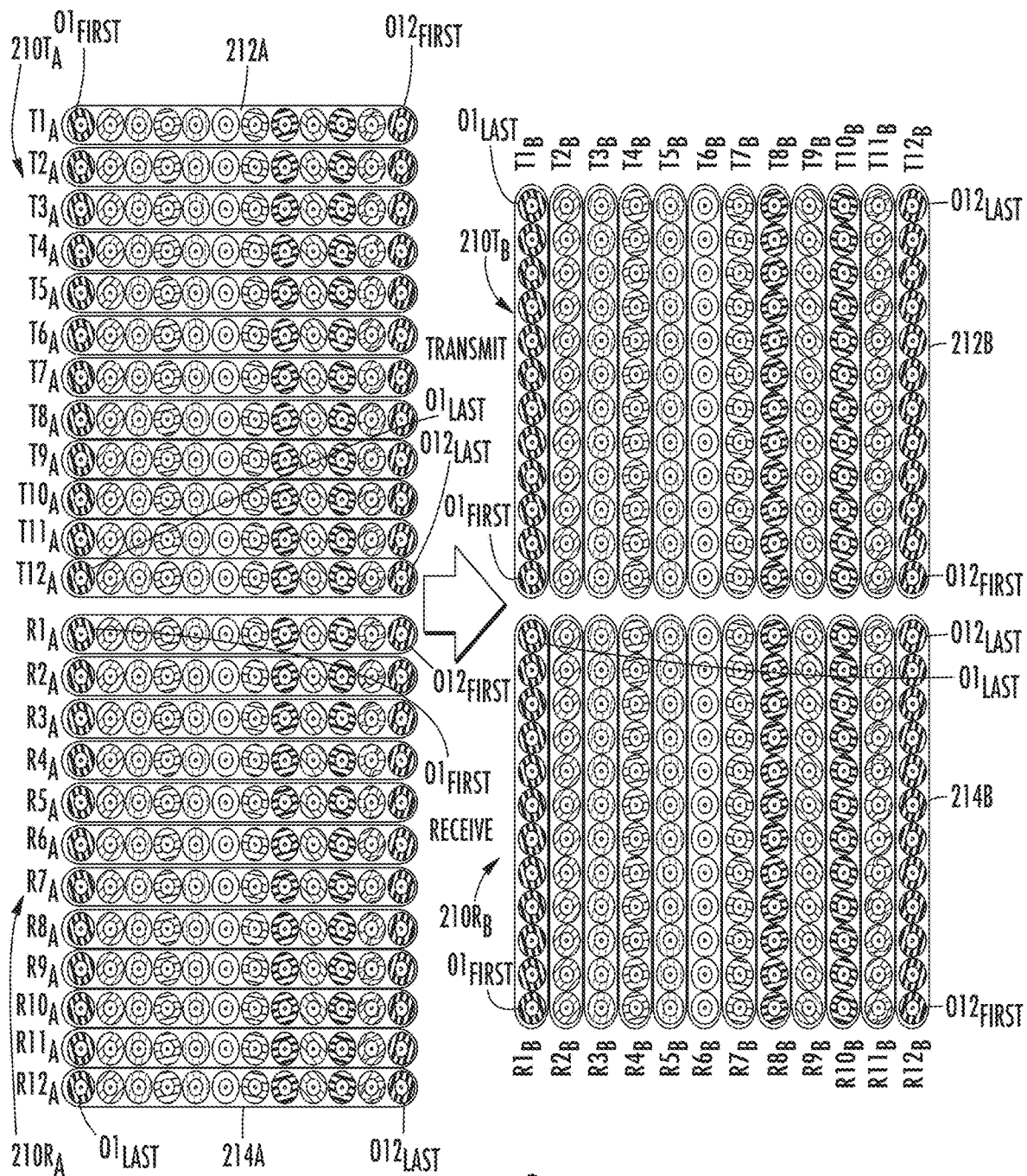
FIG. 9 is a schematic diagram illustrating fiber maps for transmit and receive arrays of ribbonized optical fibers arrangeable at or beyond opposing ends of an integrated shuffle region of a fiber optic cable assembly according to one embodiment.

FIG. 9 provides fiber maps for dedicated transmit arrays $210T_A$, $210T_B$ and receive arrays $210R_A$, $210R_B$ of ribbonized optical fibers arrangeable at (or beyond) opposing first and second ends of at least one integrated fiber shuffle region (not shown) of a fiber optic cable assembly according to one embodiment. Although the transmit arrays $210T_A$, $210T_B$ and receive arrays $210R_A$, $210R_B$ comprise ribbonized optical fibers, it is to be understood that in a fiber shuffle region, optical fibers therein are not ribbonized. Starting at the upper left of FIG. 9, the transmit array $210T_A$ includes twelve optical fiber ribbons $T1_A$-$T12_A$ that each contain a group of twelve optical fibers (ranging from $O1_{FIRST}$-$O12_{FIRST}$ for the first ribbon $T1_A$, to $O1_{LAST}$-$O12_{LAST}$ for the last ribbon $T12_A$) joined by a matrix material 212A. As shown, each optical fiber ribbon $T1_A$-$T12_A$ of the transmit array $210T_A$ includes optical fibers of different external colors and/or markings within the respective ribbon $T1_A$-$T12_A$, but each optical fiber ribbon $T1_A$-$T12_A$ has the same combination of differently colored and/or marked optical fibers. Shifting to the lower left of FIG. 9, the receive array $210R_A$ includes twelve optical fiber ribbons $R1_A$-$R12_A$ that each contain a group of twelve optical fibers (ranging from $O1_{FIRST}$-$O12_{FIRST}$ for the first ribbon $R1_A$, to $O1_{LAST}$-$O12_{LAST}$ for the last ribbon $R12_A$) joined by a matrix material 214A. As shown, each optical fiber ribbon $R1_A$-$R12_A$ of the receive array $210R_A$ includes optical fibers of different external colors and/or markings within the respective ribbon $R1_A$-$R12_A$, but each optical fiber ribbon $R1_A$-$R12_A$ has the same combination of differently colored and/or marked optical fibers. It is to be understood that at least one fiber shuffle region (e.g., a first fiber shuffle region, not shown) is arrangeable between the transmit arrays $210T_A$, $210T_B$, and at least one fiber shuffle region (e.g., a second fiber shuffle region, not shown) is arrangeable between the receive arrays $210R_A$, $210R_B$.

Turning to the upper right of FIG. 9, each optical fiber ribbon $T1_B$-$T12_B$ of the transmit array $210T_B$ includes twelve optical fibers (ranging from $O1_{FIRST}$-$O1_{LAST}$ for the first ribbon $T1_B$, to $O12_{FIRST}$-$O12_{LAST}$ for the last ribbon $T12_B$) joined by a matrix material 212B. As shown, each optical fiber ribbon $T1_B$-$T12_B$ of the transmit array $210T_B$ includes the same external color and/or marking for optical fibers within each individual ribbon $T1_B$-$T12_B$, but different external colors and/or markings between respective ribbons $T1_B$-$T12_B$. Shifting to the lower right of FIG. 9, each optical fiber ribbon $R1_B$-$R12_B$ of the receive array $210R_B$ includes twelve optical fibers (ranging from $O1_{FIRST}$-$O1_{LAST}$ for the first ribbon $R1_B$, to $O12_{FIRST}$-$O12_{LAST}$ for the last ribbon $R12_B$) joined by a matrix material 214B. As shown, each optical fiber ribbon $R1_B$-$R12_B$ of the receive array $210R_B$ includes the same external color and/or marking for optical fibers within each individual ribbon $R1_B$-$R12_B$, but different external colors and/or markings between respective ribbons $R1_B$-$R12_B$.

Although FIG. 9 depicts transmit ribbons $T1_A$-$T12_A$, $T1_B$-$T12_B$ grouped in transmit arrays $210T_A$, $210T_B$ arranged separately from receive ribbons $R1_A$-$R12_A$, $R1_B$-$R12_B$ grouped in receive arrays $210R_A$, $210R_B$, as may be appropriate proximate to a fiber shuffle region, it is to be appreciated that proximate to ends of a fiber optic cable assembly, each transmit ribbon may be paired with a corresponding receive ribbon for connectorization in a MPO-type or similar multifiber connector (e.g., including an upper row of transmit fibers and a lower row of receive fibers). For example, distal from a fiber shuffle region (not shown) and proximate to a first end of a fiber optic cable assembly, a first connector may receive an upper row of optical fibers from transmit ribbon $T1_A$ and a lower row of optical fibers from corresponding receive ribbon $R1_A$, whereas a twelfth connector may receive an upper row of optical fibers from transmit ribbon $T12_A$ and a lower row of optical fibers from corresponding receive ribbon $R12_A$. Similarly, distal from a fiber shuffle region (not shown) and proximate to a second end of a fiber optic cable assembly, a first connector may receive an upper row of optical fibers from transmit ribbon $T1_B$ and a lower row of optical fibers from corresponding receive ribbon $R1_B$, whereas a twelfth connector may receive an upper row of optical fibers from transmit ribbon $T12_B$ and a lower row of optical fibers from corresponding receive ribbon $R12_B$.

Figure 10:
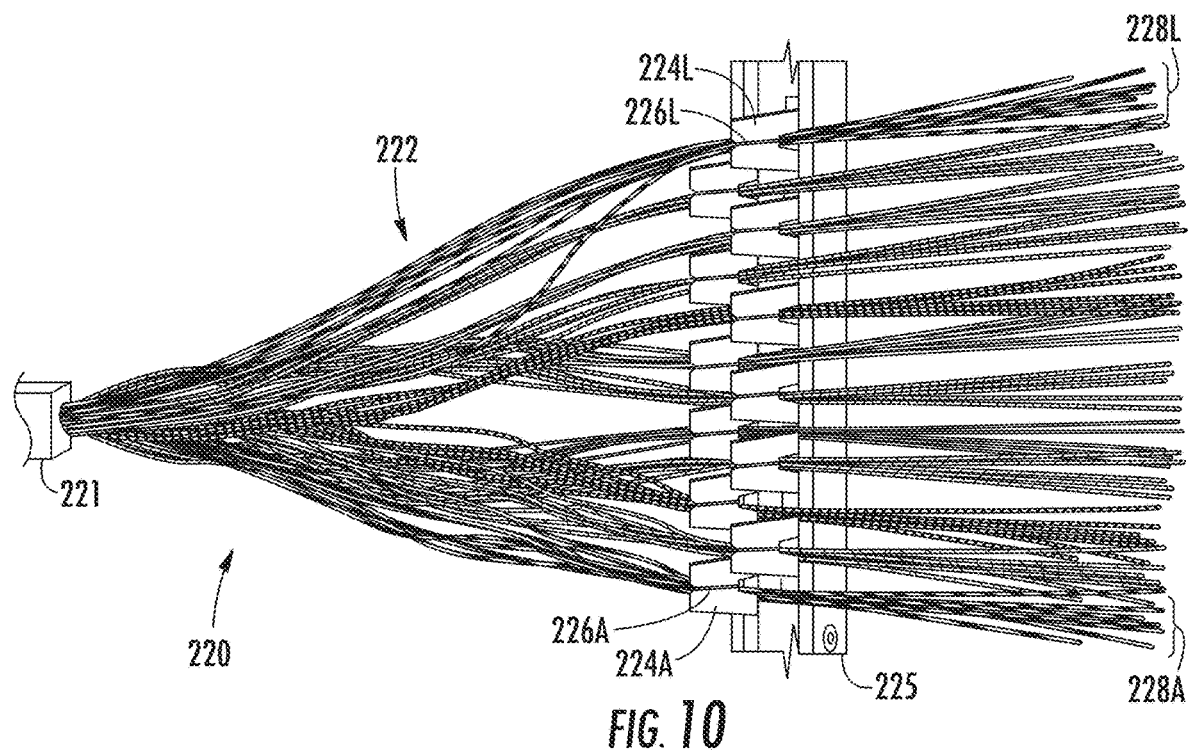
FIG. 10 is a perspective view illustration of a fiber sorting fixture including twelve fiber holders defining fiber receiving areas in which twelve sorted groups of optical fibers emanating from a ribbon cable stack are arranged.

FIG. 10 is a perspective view illustration of a fiber sorting fixture 225 including twelve fiber holders 224A-224L each including a fiber receiving area 226A-226L, with the fiber sorting fixture 225 receiving twelve sorted groups of optical fibers 228A-228L emanating from a ribbon cable stack 221, as part of an intermediate product 220 for fabricating a fiber optic cable assembly according to one embodiment. In certain embodiments, individual optical fibers may be separated from the ribbon cable stack 221, with optical fibers of the same color scheme or marking scheme being sequentially inserted into the same fiber receiving area among the multiple fiber receiving areas 226A-226L, and with optical fibers emanating from the same ribbon being inserted at corresponding positions (e.g., first, second, or third, etc.) in respective fiber receiving areas 226A-226L. In certain embodiments, each fiber receiving area 226A-226L may include a slot having a width configured to receive a single fiber, and a depth configured to receive multiple fibers arranged in a one-dimensional (e.g., vertical) array, whereby upon sequential insertion of optical fibers into the fiber receiving area 226A-226L, the optical fibers will be maintained in the same order in which they were inserted. A fiber transition region 222 is provided between the ribbon cable stack 221 and the fiber sorting fixture 225. When all fibers emanating from the ribbon cable stack 221 have been sorted and positioned in respective fiber receiving areas 226A-226L, adhesion elements (e.g., metal foil tape or the like, not shown) may be separately applied around each sorted group of optical fibers 228A-228L (e.g., proximate to the fiber holders 224A-224L) to separately join or fix the sorted groups of optical fibers 228A-228L in order to permit positioning between optical fibers within the respective groups of optical fibers 228A-228L to be maintained after the groups of optical fibers 228A-228L are removed from the fiber sorting fixture 225. Following removal of the groups of optical fibers 228A-228L from the fiber sorting fixture 225, the fiber transition region 222 (or a segment thereof) may be contained within a tubular body and/or a solid encapsulant material to provide a fiber shuffle region of a fiber optic cable assembly.

Figure 11:
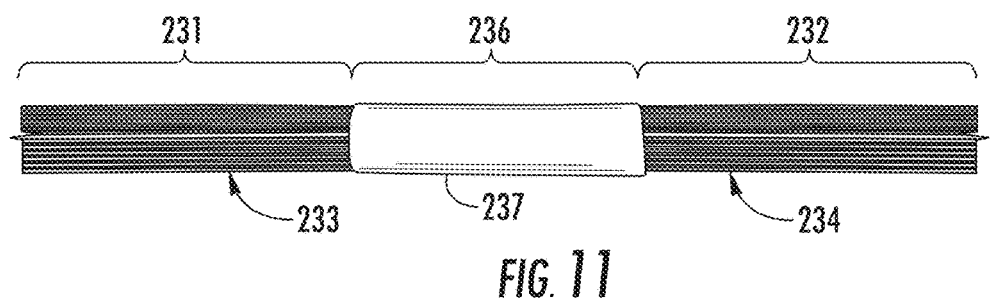
FIG. 11 is a side view illustration of an encapsulated integral fiber shuffle region arranged between first and second cable assembly sections that each include multiple optical fiber ribbons, according to one embodiment.

FIG. 11 is a side view illustration of an encapsulated integral fiber shuffle region 236 arranged between first and second cable assembly sections 231, 232. The first cable assembly section 231 includes multiple optical fiber ribbons 233, and the second cable assembly section 232 includes multiple optical fiber ribbons 234. The fiber shuffle region 236 includes a body 237 having a solid material that encapsulates external surfaces of optical fibers from the first cable assembly section 231 and the second cable assembly section 232. As shown, a width of the fiber shuffle region 236 may be substantially equal to a width of each of the first and second cable assembly sections 231, 232, and the fiber shuffle region 236 may have a length of no greater than about 5 cm, or no greater than about 2.5 cm, according to one embodiment. During fabrication, terminal portions of optical fiber ribbons 233 of the first cable assembly section 231 may be de-ribbonized, then sorted by different fiber colors with a transition region being encapsulated in the body 237 to form the fiber shuffle region 236, and fiber segments downstream of the fiber shuffle region 236 may be re-ribbonized to form the optical fiber ribbons 234 of the second cable assembly section 232. The technique shown and described with reference to FIG. 10 may be used, for example.

Figure 12:
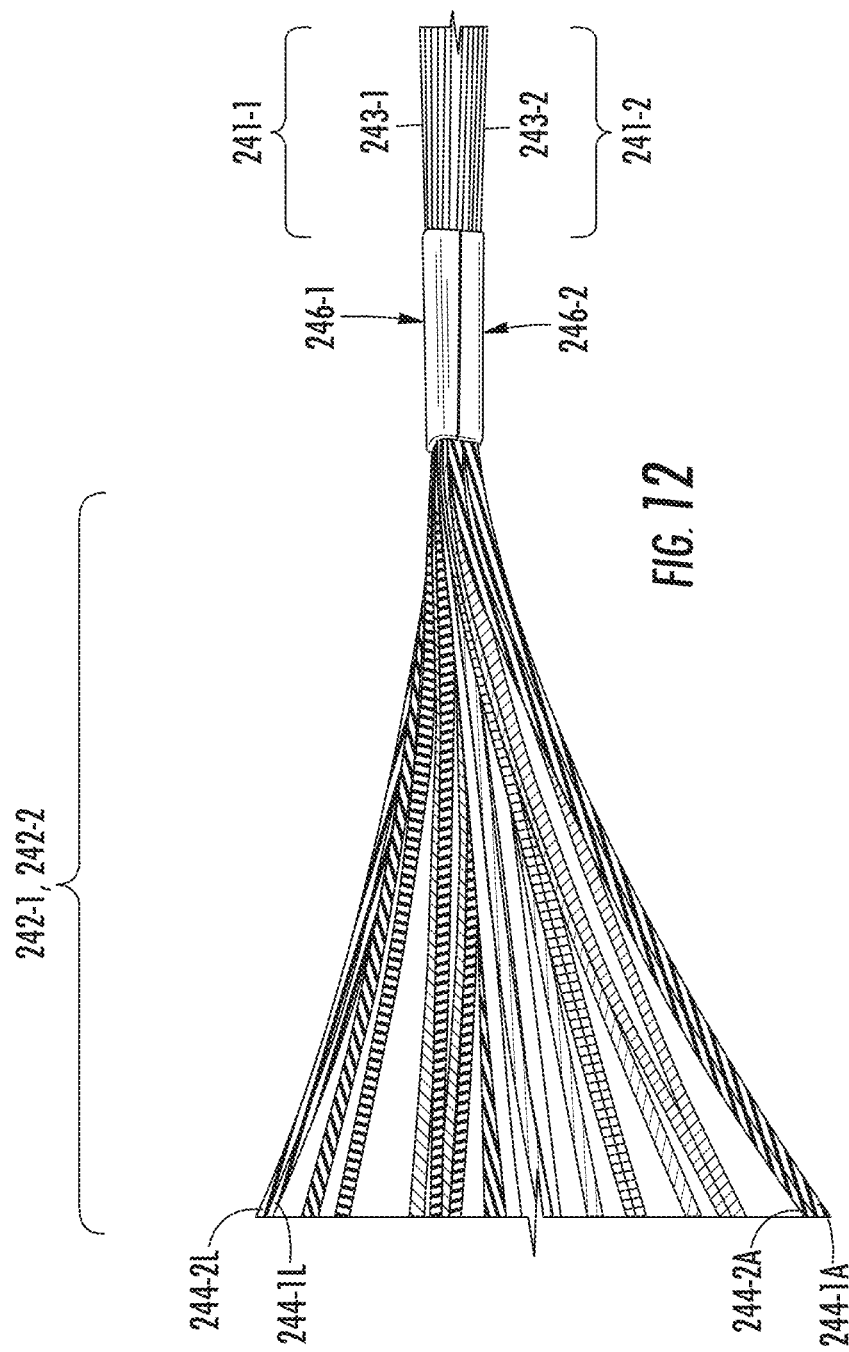
FIG. 12 is a perspective view illustration of two stacked fiber optic cable assembly portions each including an integral fiber shuffle region arranged between first and second cable assembly sections, with pairing between optical fibers having the same markings (e.g., colors).

FIG. 12 is a perspective view illustration of two stacked fiber optic cable assembly portions each including an integral fiber shuffle region 246-1, 246-2 arranged between a respective first cable assembly section 241-1, 241-2 and a second cable assembly section 242-1, 242-2. Each first cable assembly section 241-1, 241-2 includes a respective multifiber ribbon 243-1, 243-2. The second cable assembly sections 242-1, 242-2 each include multiple optical fibers 244-1A to 244-1L, 244-2A to 244-2L In the second cable assembly sections 242-1, 242-2, optical fibers 244-1A, 244-2A to 244-1L, 244-2L having corresponding markings (e.g., colors) are paired with one another, to prepare each different optical fiber pair for insertion into a respective tube (not shown) to continue fabrication of a fiber optic cable assembly (e.g., ribbonization and/or connectorization of ends of the paired optical fibers 244-1A, 244-2A to 244-1L, 244-2L).

Figure 13:
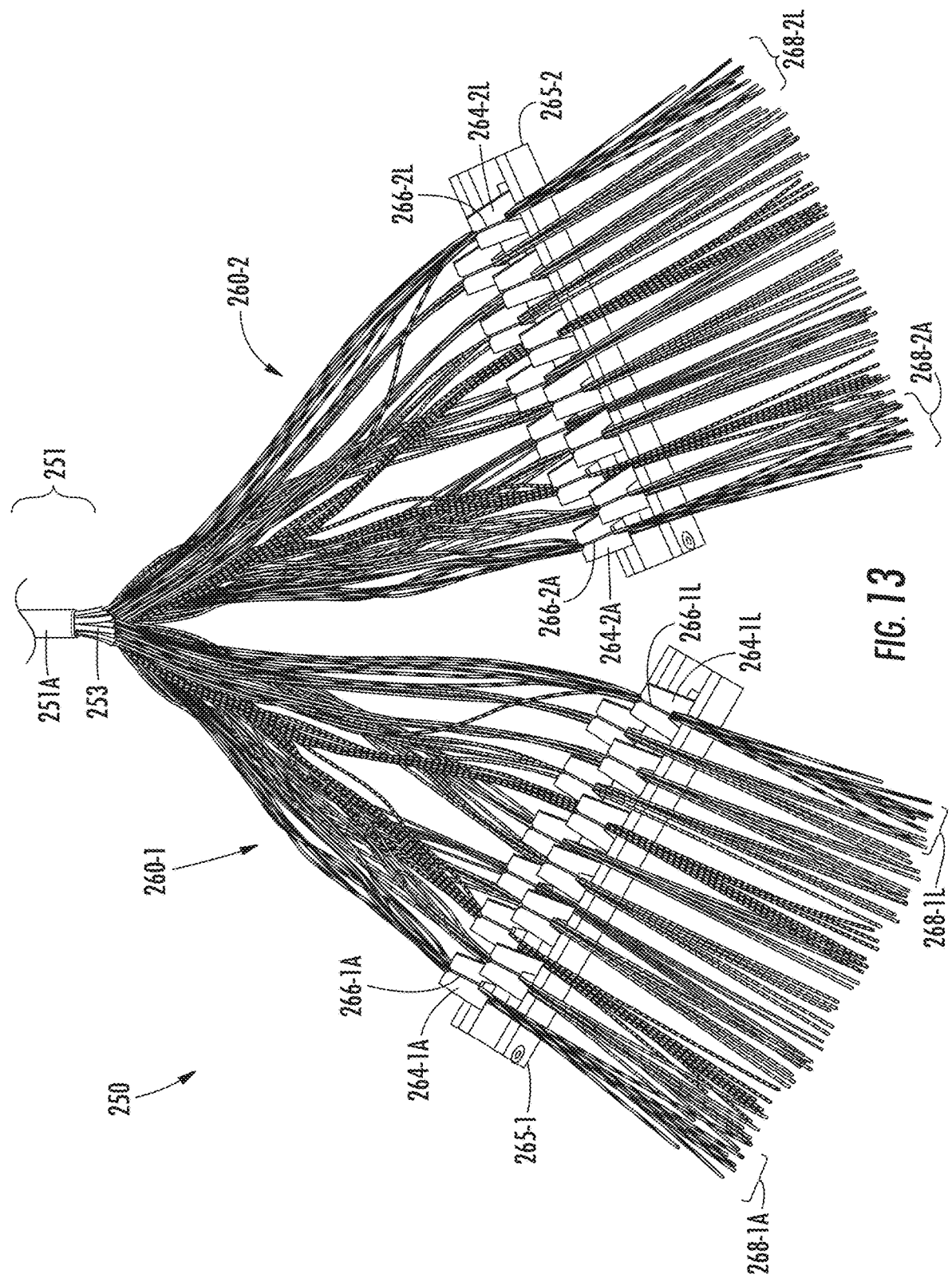
FIG. 13 is a perspective view illustration of two fiber sorting fixtures each including twelve fiber receiving areas in which twelve sorted groups of optical fibers emanating from a first cable assembly section (with 288 optical fibers) are arranged.

FIG. 13 is a perspective view illustration of two fiber sorting fixtures 265-1, 265-2 each including twelve respective fiber holders 264-1A to 264-1L and 264-2A to 264-2L, with each fiber holder 264-1A to 264-1L and 264-2A to 264-2L including a fiber receiving area 266-1A to 266-1L and 266-2A to 266-2L. In certain embodiments, each fiber receiving area 266-1A to 266-1L and 266-2A to 266-2L may include a slot having a width configured to receive a single fiber, and a depth configured to receive multiple fibers arranged in a one-dimensional (e.g., vertical) array. The first fiber sorting fixture 265-1 receives twelve sorted groups of transmit optical fibers 268-1A to 268-1L (e.g., with twelve optical fibers per group) emanating from loose tubes 253 contained in a jacket of a first cable assembly section 251, and the second sorting fixture 265-2 receives twelve sorted groups of receive optical fibers 268-2A to 268-2L (e.g., with twelve optical fibers per group) emanating from the loose tubes 253 of the first cable assembly section 251, all as part of an intermediate product 250 for fabricating a fiber optic cable assembly according to one embodiment. For the first fiber sorting fixture 265-1, individual transmit optical fibers may be separated from the loose tubes 253 (emanating from a jacket 251A), with optical fibers of the same color scheme or marking scheme being sequentially inserted into the same fiber receiving area among the multiple fiber receiving areas 266-1A to 266-1L, and with optical fibers emanating from the same loose tube 253 being inserted at corresponding positions (e.g., first, second, or third, etc.) in respective fiber receiving areas 266-1A to 266-1L. Similarly, for the second fiber sorting fixture 265-2, individual transmit optical fibers may be separated from the loose tubes 253, with optical fibers of the same color scheme or marking scheme being sequentially inserted into the same fiber receiving area among the multiple fiber receiving areas 266-2A to 266-2L, and with optical fibers emanating from the same loose tube 253 being inserted at corresponding positions (e.g., first, second, or third, etc.) in respective fiber receiving areas 266-2A to 266-2L. Upon sequential insertion of optical fibers into the fiber receiving areas 266-1A to 266-1L and 266-2A to 266-2L, optical fibers will be maintained in the same order in which they were inserted. Fiber transition regions 260-1, 260-2 are provided between the first cable assembly section 251 and the fiber sorting fixtures 265-1, 265-2. When all fibers emanating from the first cable assembly section 251 have been sorted and positioned in respective fiber receiving areas 266-1A to 266-1L and 266-2A to 266-2L, adhesion elements (e.g., metal foil tape or the like, not shown) may be separately applied around each sorted group of optical fibers 268-1A to 268-1L, 268-2A to 268-2L (e.g., proximate to the fiber holders 264-1A to 264-1L, 264-2A to 264-2L) to separately fix the sorted groups of optical fibers 268-1A to 268-1L, 268-2A to 268-2L in order to maintain positioning between optical fibers within the respective groups of optical fibers 268-1A to 268-1L, 268-2A to 268-2L after their removal from the fiber sorting fixtures 265-1, 265-2. Following removal of the groups of optical fibers 268-1A to 268-1L, 268-2A to 268-2L from the fiber sorting fixtures 265-1, 265-2, both fiber transition regions 260-1, 260-2 (or shortened segments thereof) may be contained within a tubular body and/or a solid encapsulant material to provide a fiber shuffle region of a fiber optic cable assembly (e.g., the fiber shuffle region 186 of the fiber optic cable assembly 180 of FIG. 7). In certain embodiments, one sorted and rollable fixed group of transmit optical fibers (e.g., optical fiber group 268-1A) may be paired with one corresponding sorted and rollable fixed group of receive optical fibers (e.g., optical fiber group 268-2A), optionally each arranged in a non-linear position, and threaded through a single tube (not shown), and the process may be repeated for each pair of optical fiber groups until multiple tubes each containing a different rollable fixed transmit fiber group and receive fiber group is provided. Thereafter, one multi-fiber connector per tube may be used to terminate each paired optical fiber group to include corresponding transmit and receive fibers as part of a fiber optic cable assembly.

FIG. 14 is a schematic cross-sectional view illustration of a portion of a fiber optic cable assembly 270 according to one embodiment, showing an integral fiber shuffle region 276 arranged within a tubular body 277 (which may also be referred to as a furcation) defining an internal cavity 278 that protects optical fiber cross-connections between first and second cable assembly sections 271, 272. In certain embodiments, the tubular body 277 comprises a heat shrink material (e.g., heat shrink tubing). The first cable assembly section 271 includes multiple first tubes 281A-281X as well as strength members 287 contained within a first jacket 283, with each first tube 281A-281X containing multiple optical fibers 280. The second cable assembly section 272 includes multiple second tubes 282A-282X as well as strength members 286 contained within a second jacket 284, with each second tube 282A-282X containing multiple optical fibers 280. From the first cable assembly section 271, the internal cavity 278 of the tubular body 277 receives optical fibers 280, end segments of the first tubes 281A-281X, end portions of strength members 287, and an end portion of the jacket 283. A plug member 275 is provided at one end of the tubular body 277. From the second cable assembly section 272, the internal cavity 278 of the tubular body 277 receives optical fibers 280, as well as end segments of the second tubes 282A-282X and end portions of strength members 286 that both extend through the plug member 275. Within the cavity 278 of the tubular body 277, an encapsulant material 279 is provided in contact with the optical fibers 280, the first and second tubes 281A-281X, 282A-282X, the strength members 286, 287, the first jacket 283, and the plug member 275. Presence of the encapsulant material 279 in the cavity 278 provides mechanical support for the optical fibers 280, while contact between encapsulant material 279 and the strength members 286, 287 (as well as contact between the encapsulant material 279 and the first and second tubes 281A-281X, 282A-282X and the jacket 283) may enhance tensile strength of the fiber optic cable assembly 270 and therefore provide enhanced reliability.

Figure 15A:
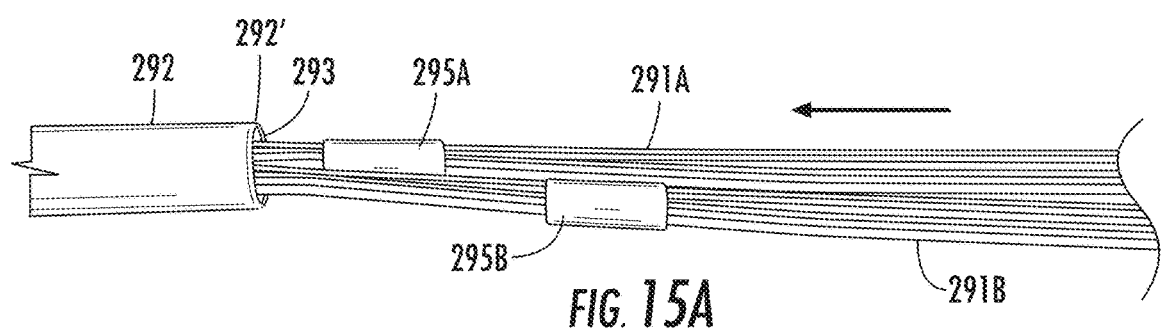
FIG. 15A is a perspective view illustration showing first and second rollable fixed arrays of optical fibers being inserted into a first end of a tube.
Figure 15B:
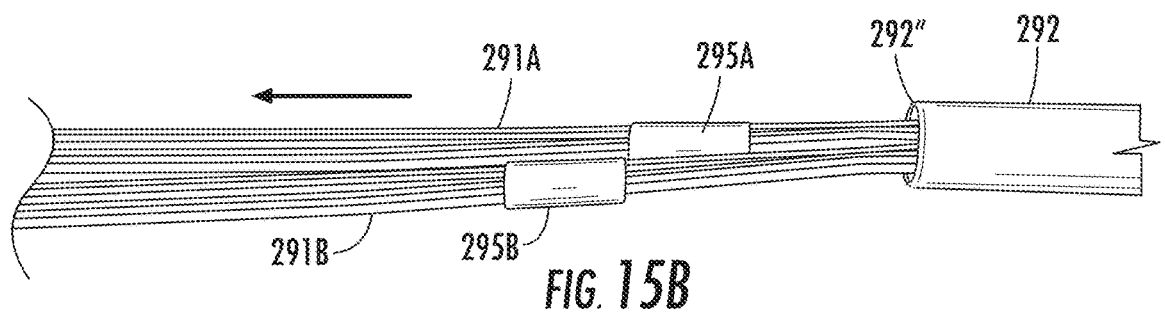
FIG. 15B is a perspective view illustration showing the first and second rollable fixed arrays of optical fibers of FIG. 15A extending through a second end of the tube after continued insertion.

FIGS. 15A and 15B are perspective view illustrations showing the positioning of first and second rollable fixed arrays of optical fibers 291A, 291B relative to a tube 292 defining a cavity 293 therein, wherein each rollable fixed array of optical fibers 291A, 291B includes an adhesion element 295A, 295B arranged to maintain positioning of optical fibers and thereby define rollable fixed array segments. In FIG. 15A, the first and second rollable fixed arrays of optical fibers 291A, 291B are arranged in non-linear positions and shown as being inserted into a first end 292' of the tube 292. The adhesion elements 295A, 295B are staggered with respect to axial position to ease insertion of the rollable fixed arrays of optical fibers 291A, 291B through the tube 292. In FIG. 15B, the first and second rollable fixed arrays 291A, 291B of optical fibers are shown as extending through a second end 292" of the tube 292 following continued insertion. In certain embodiments, the first rollable fixed array of optical fibers 291A consists of transmit fibers and the second rollable fixed array of optical fibers 291B consists of receive fibers. Following insertion of the first and second rollable, non-linearly positioned fixed arrays of optical fibers 291A, 291B through the tube 292, the first and second rollable fixed arrays of optical fibers 291A, 291B may be returned to linear positions, and ribbonized and/or connectorized together.

FIG. 16 is a perspective view illustration of a fiber optic cable assembly 300 according to one embodiment, showing an integral fiber shuffle region 306 having a tubular body 307 and arranged between first and second cable assembly sections. 301, 302. The first cable assembly 301 includes a jacket 313 containing multiple first tubes 311A-311L that each contain a group of optical fibers. When the first tubes 311A-311L emanate from the jacket 313, they may be referred to as fanout tubes. The second cable assembly 302 includes multiple second tubes 312A-312L (also known as fanout tubes) that each contain a group of optical fibers. In the integral fiber shuffle region 306, the tubular body 307 receives a portion of the jacket 313 at one end, and receives a plug member 305 at an opposing end. The tubular body 307 further receives end segments of the first tubes 311A-311L and end segments of the second tubes 312A-312L, as well as optical fibers 308 establishing optical cross-connection between the respective first tubes 311A-311L and second tubes 312A-312L. While FIG. 16 shows optical fibers 308 as extending beyond the first tubes 311A-311L and the second tubes 312A-312L in the first cable assembly section 301 and the second cable assembly section 302, respectively, it is to be appreciated that optical fibers proximate to ends of the first tubes 311A-311L and the second tubes 312A-312L may be ribbonized and/or connectorized. Such ribbonization and/or connectorization at one or more terminal ends of the fiber optic cable assembly 300 may be performed in a factory or in a field setting FIGS. 17A and 17B show a multi-fiber push-on (MPO)-type connector 375 installed on a fiber optic cable 376 to form a fiber optic cable assembly 377. The MPO-type connector 375 includes a ferrule 378, a housing 379 received over the ferrule 378, a slider or slide lock 380 received over the housing 379, and a boot 381 received over the fiber optic cable 376. The ferrule 378 is spring-biased within the housing 379 so that a front portion 382 of the ferrule 378 extends beyond a front end 383 of the housing 379. Multiple optical fibers (not shown) carried by the fiber optic cable 376 extend through bores 384 (also known as micro-holes) defined in the ferrule 378 before terminating at or near a front end face 385 of the ferrule 378. The optical fibers are secured within the ferrule 378 as described above, such as by using an adhesive material (e.g., epoxy). The optical fibers can be presented for optical coupling with optical fibers of a mating component (e.g., another fiber optic connector; not shown) when the housing 379 is inserted into an adapter, receptacle, or the like.

As shown in FIG. 17B, the MPO-type connector 375 also includes a ferrule boot 386, guide pin assembly 387, spring 388, crimp body 389, and crimp ring 390. Optical fibers extend through an aperture defined through the ferrule boot 386. The guide pin assembly 387 includes a pair of guide pins 392 extending from a pin keeper 393. When the MPO-type connector 375 is assembled, the pin keeper 393 is positioned against a back surface of the ferrule 378, and the guide pins 392 extend through pin holes 394 (shown in FIG. 17A) provided in the ferrule 378 so as to project beyond the front end face 385 of the ferrule 378. Both the ferrule 378 and guide pin assembly 387 are biased to a forward position relative to the housing 379 by the spring 388, which is positioned between the pin keeper 393 and a portion of the crimp body 389. The crimp body 389 includes latching arms 395 that engage recesses 396 in the housing 379. A rear portion 391 of the ferrule 378 defines a flange that interacts with a shoulder or stop formed within the housing 379 for retention of the rear portion 391 of the ferrule 378 in the housing 379. In a manner not shown in the figures, strength members (e.g., aramid yarn) from the fiber optic cable 376 may be positioned over an end portion 397 of the crimp body 389 that projects rearwardly from the housing 379, and the strength members are secured to the end portion 397 by deformation of the crimp ring 390. The boot 381 covers this region, as shown in FIG. 17A, and provides strain relief for optical fibers emanating from the fiber optic cable 376 by limiting the extent to which the MPO-type connector 375 can bend relative to the fiber optic cable 376.

Figure 18:
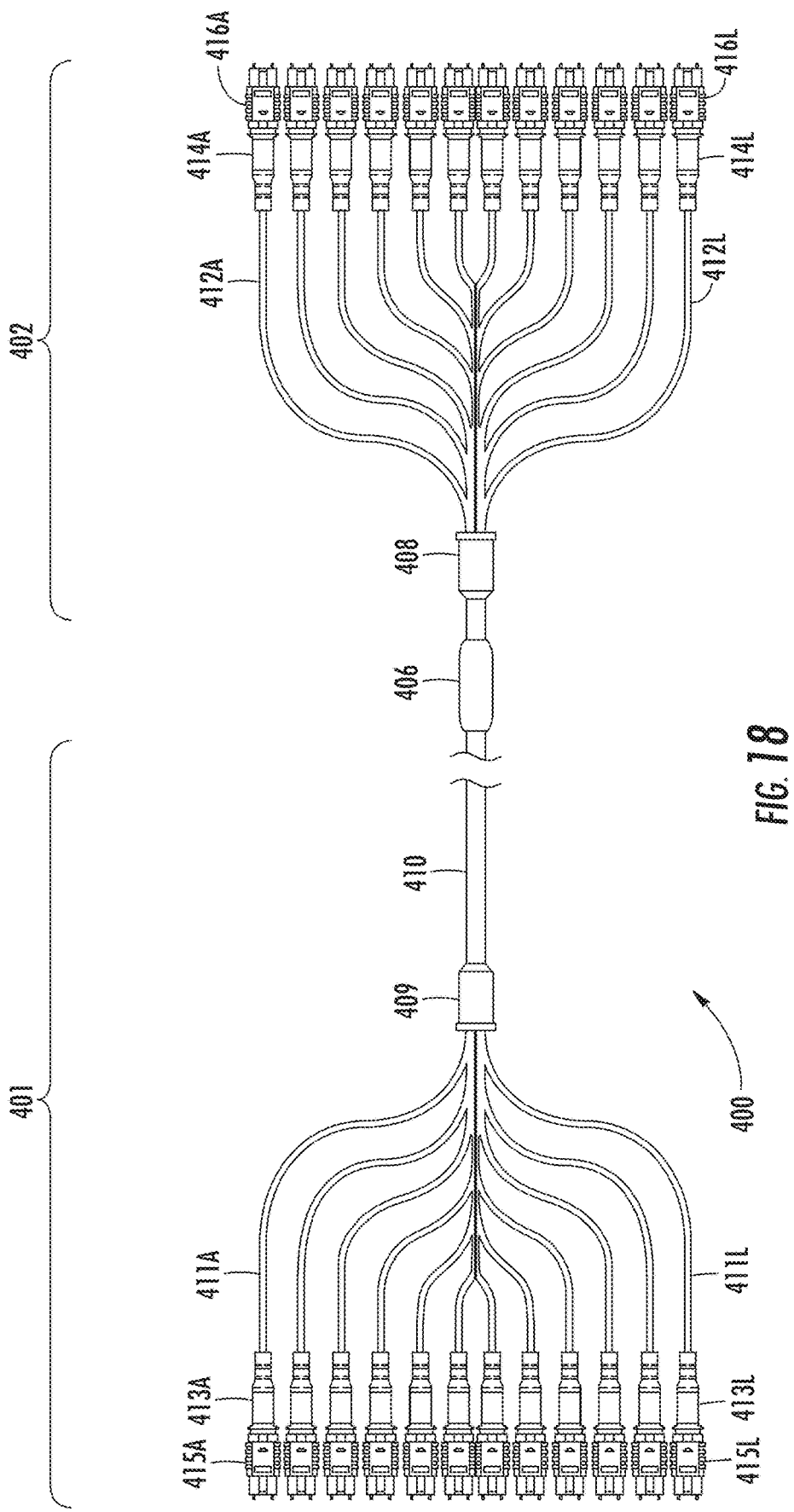
FIG. 18 is a top view illustration of a fiber optic cable assembly according to one embodiment, showing an integral fiber shuffle region arranged between first and second cable assembly sections, with each cable assembly section being terminated by a MPO-type connector.

FIG. 18 is a top view illustration of a fiber optic cable assembly 400 according to one embodiment, including an integral fiber shuffle region 406 arranged between first and second cable assembly sections 401, 402. The first cable assembly section 401 includes a jacketed trunk segment 410 that contains multiple first tubes 411A-411L each containing a group of optical fibers therein. A transition structure 409 is arranged at one end of the trunk segment 410, where segments of individual first tubes 411A-411L (also known as fanout tubes) emerge from the trunk segment 410, with terminal portions of optical fibers from the first tubes 411A-411L being terminated at connectors 415A-415L. Terminal portions of the optical fibers from the first tubes 411A-411L may also be ribbonized to form ribbon sections 413A-413L (arranged within connectors 415A-415L) prior to connectorization. The first cable assembly section 401 includes a jacketed trunk segment 410 that contains multiple first tubes 411A-411L each containing a group of optical fibers therein. A transition structure 409 is arranged at one end of the trunk segment 410, where segments of individual first tubes 411A-411L emerge from the trunk segment 410, with terminal portions of optical fibers from the first tubes 411A-411L being terminated at connectors 415A-415L. Terminal portions of the optical fibers from the first tubes 411A-411L may also be ribbonized to form ribbon sections 413A-413L (arranged within connectors 415A-415L) prior to connectorization. As illustrated, the connectors 415A-415L are MPO-type connectors permitting termination of multiple optical fibers (e.g., 4, 8, 12, 16, 24, 32, 48, etc.) in one or more rows. The second cable assembly section 402 includes multiple second tubes 412A-412L each containing a group of optical fibers therein. A transition structure 409 is arranged at one end of a jacket to provide reinforcement where segments of individual second tubes 412A-412L emerge, with terminal portions of optical fibers from the second tubes 412A-412L (also known as fanout tubes) being terminated at connectors 416A-416L. Terminal portions of the optical fibers from the second tubes 412A-412L may also be ribbonized to form ribbon sections 414A-414L (arranged within connectors 416A-416L) prior to connectorization. As shown, the connectors 415A-415L, 416A-416L are MPO-type connectors permitting termination of multiple optical fibers in one or more rows. In certain embodiments, each connector 415A-415L, 416A-416L terminates multiple transmit fibers and multiple corresponding receive fibers to provide multiple links.

Further aspects of the disclosure relate to a method for fabricating a fiber optic cable assembly. A method comprises providing M groups of N optical fibers in a first cable assembly section, with each group of the M groups of N optical fibers including ordered optical fibers O1 to OX as members, wherein M≥4 and X≥4, such that a first group of the M groups of N optical fibers includes ordered optical fibers $O1_{FIRST}$ to $OX_{FIRST}$, and a last group of the M groups of N optical fibers includes ordered optical fibers $O1_{LAST}$ to $OX_{LAST}$. The method further comprises, sequentially for each group of the M groups of N optical fibers, inserting a segment of each ordered optical fiber into a different receiving area of a plurality of receiving areas of a fiber sorting fixture to form a plurality of linear arrays of optical fibers including a different linear array of ordered optical fibers within each receiving area, wherein a first receiving area of the plurality of receiving areas receives optical fibers $O1_{FIRST}$ to $O1_{LAST}$ in sequential order to form a first linear array of the plurality of linear arrays of optical fibers, and a last receiving area of the plurality of receiving areas receives optical fibers $OX_{FIRST}$ to $OX_{LAST}$ in sequential order to form a last linear array of the plurality of linear arrays of optical fibers. The method additionally comprises, for each linear array of the plurality of linear arrays of optical fibers, separately fixing at least one segment of the linear array with an adhesion element to form encircled rollable fixed array of optical fibers, and arranging the rollable fixed array of optical fibers in a non-linear position, thereby yielding a plurality of rollable, non-linearly positioned fixed arrays of optical fibers from the plurality of linear arrays of optical fibers. The method further comprises threading the plurality of rollable, non-linearly positioned fixed arrays of optical fibers through a plurality of second tubes as formative elements of a second cable assembly section including N groups of M optical fibers. The method additionally comprises enclosing a transition between the M groups of N optical fibers of the first cable assembly section and the N groups of M optical fibers of the second cable assembly section to form an integral fiber shuffle region of the fiber optic cable assembly.

Expanding on the preceding method, in certain embodiments the first cable assembly section comprises a plurality of first tubes arranged within a jacket, wherein each first tube within the jacket contains a different group of N optical fibers of the M groups of N optical fibers. In certain embodiments, each first tube of the plurality of first tube includes an end segment extending into the integral fiber shuffle region. In certain embodiments, the integral fiber shuffle region comprises at least one of: (A) a length of no greater than 10 cm, or (B) a width no greater than a width of the jacket.

In certain embodiments, a method further comprises individually ribbonizing a segment of each rollable fixed array of optical fibers of the plurality of rollable fixed arrays of optical fibers to form a plurality of ribbonized arrays of optical fibers. In certain embodiments, a method further comprises the plurality of ribbonized arrays of optical fibers with a plurality of optical connectors (optionally embodied in a plurality of multi-fiber optical connectors).

In certain embodiments, a method further comprises terminating the plurality of ribbonized arrays of optical fibers with a plurality of multi-fiber optical connectors, wherein each multi-fiber optical connector of the plurality of multi-fiber optical connectors terminates optical fibers of at least two ribbonized arrays of optical fibers of the plurality of ribbonized arrays of optical fibers.

In certain embodiments, each adhesion element comprises a plastically deformable adhesion element, and the method further comprises, for each rollable fixed array of optical fibers of the plurality of rollable fixed arrays of optical fibers, deforming the plastically deformable adhesion element and arranging the rollable fixed array of optical fibers in a non-linear position before completing the threading of the plurality of rollable fixed arrays of optical fibers through the plurality of second tubes.

In certain embodiments, the threading of the plurality of rollable fixed arrays of optical fibers through the plurality of second tubes comprises threading two rollable fixed arrays of optical fibers through a respective second tube of the plurality of second tubes.

In certain embodiments, the forming of the integral fiber shuffle region comprises contacting exterior portions of the M groups of N optical fibers and the N groups of M optical fibers with encapsulant material. In certain embodiments, the first cable assembly section comprises strength members of fibrous or string-like material, and the forming of the integral fiber shuffle region further comprises contacting end portions of the strength members with the encapsulant material. In certain embodiments, a method further comprises supplying the encapsulant material to the integral fiber shuffle region in liquid form, followed by curing or otherwise solidifying the encapsulant material to form a solid encapsulant.

Aspects of the disclosure may also be understood by review of the following Examples.

Example 1: Compact 288 Fiber Shuffle Based on Ribbon Cable

Optical fiber ribbons emanating from a cable are prearranged into two stacked groups according to the arrangement shown in FIG. 12, each having twelve ribbons with twelve optical fibers per ribbon. One of the optical fiber ribbon groups comprises only transmit fibers and the other optical fiber ribbon group comprises only receive fibers.

Use of a ribbon stack lends itself to mesh connectivity, utilizing steps of separating fibers from the ribbons, sequentially sorting fibers by color using sorting fixtures as disclosed herein (e.g., in FIG. 13), and re-ribbonizing fibers of the same color. In practice, a stack of twelve optical fiber ribbons may be aligned and mounted in a fixture. Individual optical fibers may be separated from the optical fiber ribbons and stacked sequentially into fiber receiving areas of fiber holders associated with fiber sorting fixtures as illustrated in FIG. 13. In one embodiment the sorted (i.e., "shuffled") optical fiber in each fiber receiving area form a group and are ribbonized using thermoplastic polymer. The ribbonizing process generates a ribbon that appears glossy on one side and matte on the other side, thus allowing for polarity identification even though all the fibers in the ribbon have the same color. The shuffled transmit ribbons are marked to distinguish those from the shuffled receive ribbons. FIG. 11 shows a re-ribbonized shuffle, where the transition from a first cable assembly section (i.e., a normal optical fiber ribbon stack) to a second cable assembly section (i.e., a shuffled optical fiber ribbon stack) is less than 2 cm long.

Example 2: Compact 288 Fiber Shuffle Based on Distribution Cable

In another embodiment, a 384 fiber super trunk is downgraded to 288 fibers by using only 12 of the 16 sub-units. The cable is oriented so that the first sub-unit (e.g., first round fanout tube) is at the lower position. The shuffling process starts sequentially according to the sub-unit number. The jacket is removed, and optical fibers are sorted into fiber receiving areas of fiber holders of two fiber sorting fixtures according to exterior colors and ring marks on the fibers into 24 groups, as shown in FIG. 13. The fibers may be re-ribbonized using the method described in Example 1. The sorted fiber group in each fiber receiving area is rollably fixed using a plastically deformable adhesion element such as copper foil tape as described previously herein, and arranged in a non-linear position (e.g., folded into an unfoldable bundle). Two rollable, non-linearly positioned fixed (e.g., bundled) arrays of optical fibers with the same color (with one set having ring marks) are fed into a round fanout tube, as illustrated in FIGS. 15A-15B. The rollable, non-linearly positioned fixed arrays of optical fibers exiting the fanout tube are unfolded or otherwise returned into the original shape of a linear fiber array, with the fiber sequence being preserved for subsequent termination. FIG. 16 shows the resulting fiber shuffle region arranged in a tubular body serving as a furcation to house the optical shuffle and end segments of the tubes. A length of the shuffle region is about 50 mm, which provides sufficient length for the fibers to be shuffled without micro-bends. The tubular body can be filled with encapsulant material (e.g., adhesive) similar to furcation plugs.

Technical benefits that may be provided by embodiments disclosed herein include one or more of the following: reduced cost and volume requirements for making optical cross-connections in leaf-spine networks; enhanced ease and speed in making optical cross-connections in leaf-spine networks; and reduced optical insertion loss by elimination of interconnects associated with conventional shuffle boxes.

Those skilled in the art will appreciate that various modifications and variations can be made without departing from the spirit or scope of the invention. Since modifications, combinations, sub-combinations, and variations of the disclosed embodiments incorporating the spirit and substance of the invention may occur to persons skilled in the art, the invention should be construed to include everything within the scope of the appended claims and their equivalents. The claims as set forth below are incorporated into and constitute part of this detailed description.

It will also be apparent to those skilled in the art that unless otherwise expressly stated, it is in no way intended that any method in this disclosure be construed as requiring that its steps be performed in a specific order. Accordingly, where a method claim below does not actually recite an order to be followed by its steps or it is not otherwise specifically stated in the claims or descriptions that the steps are to be limited to a specific order, it is no way intended that any particular order be inferred.

What is claimed is:

1. A method for fabricating a fiber optic cable assembly, the method comprising:
providing M groups of N optical fibers in a first cable assembly section, with each group of the M groups of N optical fibers including ordered optical fibers O1 to OX as members, and wherein M≥4 and X≥4, such that a first group of the M groups of N optical fibers includes ordered optical fibers $O1_{FIRST}$ to $OX_{FIRST}$, and a last group of the M groups of N optical fibers includes ordered optical fibers $O1_{LAST}$ to $OX_{LAST}$;
sequentially for each group of the M groups of N optical fibers, inserting a segment of each ordered optical fiber into a different receiving area of a plurality of receiving areas of a fiber sorting fixture to form a plurality of linear arrays of optical fibers including a different linear array of ordered optical fibers within each receiving area, wherein a first receiving area of the plurality of receiving areas receives optical fibers $O1_{FIRST}$ to $O1_{LAST}$ in sequential order to form a first linear array of the plurality of linear arrays of optical fibers, and a last receiving area of the plurality of receiving areas receives optical fibers $OX_{FIRST}$ to $OX_{LAST}$ in sequential order to form a last linear array of the plurality of linear arrays of optical fibers;
for each linear array of the plurality of linear arrays of optical fibers, separately fixing at least one segment of the linear array with an adhesion element to form a rollable fixed array of optical fibers, and arranging the rollable fixed array of optical fibers in a non-linear position, thereby yielding a plurality of rollable, non-linearly positioned fixed arrays of optical fibers from the plurality of linear arrays of optical fibers;
threading the plurality of rollable, non-linearly positioned fixed arrays of optical fibers through a plurality of second tubes as formative elements of a second cable assembly section including N groups of M optical fibers; and
enclosing a transition between the M groups of N optical fibers of the first cable assembly section and the N groups of M optical fibers of the second cable assembly section to form an integral fiber shuffle region of the fiber optic cable assembly.

2. The method of claim 1, wherein the first cable assembly section comprises a plurality of first tubes arranged within a jacket, wherein each first tube within the jacket contains a different group of N optical fibers of the M groups of N optical fibers.

3. The method of claim 2, wherein each first tube of the plurality of first tube includes an end segment extending into the integral fiber shuffle region.

4. The method of claim 1, wherein the integral fiber shuffle region comprises at least one of: (A) a length of no greater than 10 cm, or (B) a width no greater than a width of a jacket.

5. The method of claim 1, further comprising individually ribbonizing a segment of each rollable fixed array of optical fibers of the plurality of rollable fixed arrays of optical fibers to form a plurality of ribbonized arrays of optical fibers.

6. The method of claim 5, further comprising terminating the plurality of ribbonized arrays of optical fibers with a plurality of optical connectors.

7. The method of claim 6, wherein the plurality of optical connectors comprises a plurality of multi-fiber optical connectors.

8. The method of claim 5, further comprising terminating the plurality of ribbonized arrays of optical fibers with a plurality of multi-fiber optical connectors, wherein each multi-fiber optical connector of the plurality of multi-fiber optical connectors terminates optical fibers of at least two ribbonized arrays of optical fibers of the plurality of ribbonized arrays of optical fibers.

9. The method of claim 1, wherein each adhesion element comprises a plastically deformable adhesion element, and the method further comprises, for each rollable fixed array of optical fibers of the plurality of rollable fixed arrays of optical fibers, deforming the plastically deformable adhesion element and arranging the rollable fixed array of optical fibers in a non-linear position before completing the threading of the plurality of rollable fixed arrays of optical fibers through the plurality of second tubes.

10. The method of claim 1, wherein the threading of the plurality of rollable, non-linearly positioned fixed arrays of optical fibers through the plurality of second tubes comprises threading two rollable, non-linearly positioned fixed arrays of optical fibers through a respective second tube of the plurality of second tubes.

11. The method of claim 1, wherein the forming of the integral fiber shuffle region comprises contacting exterior portions of the M groups of N optical fibers and the N groups of M optical fibers with encapsulant material.

12. The method of claim 11, wherein the first cable assembly section comprises strength members of fibrous or string-like material, and the forming of the integral fiber shuffle region further comprises contacting end portions of the strength members with the encapsulant material.

13. The method of claim 12, further comprising supplying the encapsulant material to the integral fiber shuffle region in liquid form, followed by curing or otherwise solidifying the encapsulant material to form a solid encapsulant.

* * * * *